United States Patent [19]
Schipper et al.

[11] Patent Number: 6,038,444
[45] Date of Patent: Mar. 14, 2000

[54] METHOD AND APPARATUS FOR ADVISING CELLPHONE USERS OF POSSIBLE ACTIONS TO AVOID DROPPED CALLS

[75] Inventors: John F. Schipper, Palo Alto; Hamid Najafi; James M. Janky, both of Los Altos, all of Calif.

[73] Assignee: Trimble Navigation Limited, Sunnyvale, Calif.

[21] Appl. No.: 08/929,597

[22] Filed: Sep. 15, 1997

Related U.S. Application Data

[63] Continuation-in-part of application No. 08/292,856, Aug. 19, 1994, Pat. No. 5,669,061.

[51] Int. Cl.$^7$ .................................................. H04Q 7/34
[52] U.S. Cl. .................. 455/421; 455/440; 455/441; 455/457; 455/517; 455/566; 455/575
[58] Field of Search .................. 455/421, 440, 455/441, 456, 457, 422, 517, 550, 575, 566

[56] References Cited

U.S. PATENT DOCUMENTS

| | | | |
|---|---|---|---|
| 4,463,357 | 7/1984 | MacDoran | 343/460 |
| 5,432,842 | 7/1995 | Kinoshita et al. | 455/440 |
| 5,471,650 | 11/1995 | Vexler et al. | 455/421 X |
| 5,483,644 | 1/1996 | Moritz et al. | 455/13.1 |
| 5,546,445 | 8/1996 | Dennison et al. | 379/60 |
| 5,551,058 | 8/1996 | Hutcheson et al. | 455/33.2 |
| 5,551,059 | 8/1996 | Hutcheson et al. | 455/33.2 |
| 5,557,657 | 9/1996 | Barnett | 379/60 |
| 5,640,676 | 6/1997 | Garncarz et al. | 455/33.2 |
| 5,809,414 | 9/1998 | Coverdale et al. | 455/421 |

OTHER PUBLICATIONS

Tom Logsdon, "The Navstar Global Positioning System," pp. 1–91, Van Nostrand Reinhold, 1992.

D.M. Balston and R.C.V. Macario, editors, "Cellular Radio Systems," chapters 1–2, and 6–7, pp. 3–72, and 153–206, Artech House, 1993.

"Navstar GPS Space Segment/Navigation User Interfaces," Interface Control Document GPS(200), No. ICD–GPS–200, Rockwell International, Satellite Systems Division, Rev. B–PR, IRN–200B–PR–001, Apr. 16, 1993.

William C.Y. Lee, "Mobile Cellular Telecommunications Analog and Digital Systems," 2nd edition, pp. 53–71, McGraw–Hill, 1995.

*Primary Examiner*—Wellington Chin
*Assistant Examiner*—Philip J. Sobutka
*Attorney, Agent, or Firm*—John F. Schipper

[57] ABSTRACT

Method and apparatus for tracking the location of, and for providing cellular telephone handoff for, a mobile cellphone user as the user moves from one cell to another. A boundary curve B12 between a first cell and an adjacent second cell is defined in an electronic map. First and second quasi-boundary curves QB1 and QB2, lying within the first and second cell, respectively, are defined, where each point on the curve QBi (i=1,2) lies at a selected distance from the boundary curve B12. A common region CR12 of points lying between the quasi-boundary curves QB1 and QB2 and including the boundary curve B12 is defined. The present cellphone location of the cellphone user is determined using a location determination system, such as GPS or GLONASS or a ground-based system. Cellular telephone service for the cellphone user is provided by a first cell site or by a second cell site, when the cellphone user is located within the first cell or the second cell, not including the overlap region CR12. When the cellphone user enters the region CR12 from within the first cell and proceeds toward the boundary curve B12, the user cellphone notifies at least one of the first and second cell sites that the cellphone user is about to leave the first cell and about to enter the second cell. The system advises the user if the cellphone is about to pass to another cell in which a cellular connection is likely to be dropped because no handoff cellular frequencies are available, or because the cellphone is about to enter a hole region where signal strength is less than an acceptable threshold value.

18 Claims, 17 Drawing Sheets

METHOD AND APPARATUS FOR ADVISING CELLPHONE USERS OF POSSIBLE ACTIONS TO AVOID DROPPED CALLS

FIELD OF THE INVENTION

This application is a continuation-in-part of U.S. patent application Ser. No. 08/292,856, filed on Aug. 19, 1994 now U.S. Pat. No. 5,669,061. This invention relates to determination of which service zone a roving active cellular phone has entered, is about to enter or may enter within a known time frame and use of this information to avoid dropping a cellphone connection for a conversation in progress.

BACKGROUND OF THE INVENTION

The number of cellular phone users in the U.S. is now estimated at about 17 million and continues to grow at a rate exceeding 20 percent per year. Most of this growth in use has occurred in and around cities and towns with populations of 20,000 or more and has caused saturation of the channels available for cellular communication in many of these urban areas. Cellular service zones, referred to herein as "cellzones" or "cells" for convenience, servicing about 800 cellular telephone communications have decreased in size from several miles in diameter to a few hundred meters in diameter as the density of cellphone users has increased apace in urban and suburban areas.

A cellphone subscriber will typically register use of a cellphone in a home cellzone and will temporarily re-register in one or more nearby cellzones if the subscriber makes or receives cellphone calls in these other cellzones. However, even where the cellphone subscriber is already registered in one-or-more nearby cellzones, the operator of any cellzone will typically be unaware of the presence of this subscriber, unless this subscriber has either recently requested cellular service in this zone or has somehow notified the operator that the subscriber is currently present in this zone. Knowledge of the number of cellphone subscribers currently in a given cellzone, who are not all active users of the cellular phone service at any given moment, may allow the service operator to rationally plan its present provision, and future expansion, of cellular service to accommodate the increasing demands.

Typically, a geographic region is divided into a plurality of polygonal cells having determinable diameters, and each cell is allocated a mutually exclusive subset S1, S2, S3, etc. of cellphone frequencies, as illustrated in FIG. 7. If the cellphone signal strengths and cellular service provider (MTSO) signal strengths are chosen carefully, a first cellzone located at least three cell diameters away from a second cellzone may use the same set of cellular frequencies as does the first cellzone, and little or no cellular signal interference will result from this re-use of cellular signal frequencies. About 333 cellular frequencies are available for each MTSO, with one pair being used for each cellular phone call or for supervisory signaling, so that an average of about $333 \div 7 \approx 47$ cellular frequency pairs are available for use in cellular phone calls and supervisory signaling per cellzone. Cellular phone protocols and allocation of frequency pairs are discussed by D. M. Balston and R. C. V. Macario, *Cellular Radio Systems*, Artech House, Boston, 1993, pp. 3–72, by J. D. Gibson (ed.), *The Mobile Communications Handbook*, CRC Press, 1996, Boca Raton, pp. 242–288 and 319–332, and by W. C. Y. Lee in *Mobile Cellular Telecommunications*, McGraw Hill, Second Edition, 1995, pp. 53–70 and 257–280.

When responsibility for servicing a given cellphone is handed off from a first cell site to a second cell site, the second cell site may not have presently have an available cellular frequency pair that can be used to service the given cellphone and handoff is unavailable. In this instance, cellular service for that cellphone is unceremoniously dropped. Further, the cellphone may find itself in a signal strength "hole" or gap within a formally defined cell, where the strength of a cellular signal received from the responsible cell site is too weak to support a cellular connection with reasonable signal quality, and signals received from cell sites located in adjacent cells also have insufficient strength. In these two situations, discussed by Lee, op cit, pp. 283–305, handoff may be unavailable. This may be tolerable where the given cellphone is initiating or receiving a cellphone call and the voice or other exchange has not yet begun; the initiating cellphone merely re-initiates the cellphone call. However, dropping cellphone service in the middle of a conversation may have serious consequences for the parties to the conversation, especially if the conversation includes transmission of data. Lojack Corp. of Dedham, Mass. has demonstrated a vehicle location system using triangulation of radio signals transmitted from the vehicle by a large number of receivers that are strategically positioned around a community. The vehicle transmitter is remotely activated by a signal broadcast from elsewhere.

Vehicle and person location techniques using location determination systems, including cellular phone systems, are disclosed in several U.S. patents that rely upon Global Positioning System (GPS) signals or selected radiowave signals to determine the user's present location.

Cellular phone handoff techniques, relying mostly upon analysis of changing signal strength, response signal time delay or assigned call priority, are disclosed in several recent U.S. patents, including U.S. Pat. No. 5,483,664, issued to Moritz et al, U.S. Pat. No. 5,546,445, issued to Dennison et al, U.S. Pat. No. 5,551,058 and U.S. Pat. No. 5,551,059, issued to Hutcheson et al, U.S. Pat. No. 5,557,657, issued to Barnett, U.S. Pat. No. 5,640,676, issued to Gamcarz et al, and U.S. Pat. No. 5,649,291, issued to Tayloe.

These patents disclose use of GPS or radiowave technology for determination of location or orientation of a person or vehicle continuously or at discrete times, usually without regard to which of several geographically defined zones the person or vehicle may last have entered. What is needed is a system that automatically tracks the movement of a vehicle or person, such as a cellphone subscriber, who moves from one cellzone to another, irrespective of whether a given cellphone subscriber is actively using cellular phone service as a boundary is crossed between two adjacent cellzones. Preferably, this system should accurately determine which cellzone a given subscriber currently moves in and should be flexible enough to cover cellzones of arbitrary and changeable sizes, shapes and densities.

What is further needed is a system that uses its knowledge of the location vector and velocity vector of a cellphone subscriber, who is currently engaged in a cellular telephone conversation, (1) to advise the subscriber of an approaching crossing of a cell boundary, (2) to advise the subscriber whether an unused cellular frequency pair is (likely to be) available in a "handoff" cell into which the subscriber is likely to pass, (3) to advise the subscriber of an anticipated or extant decrease in signal strength that seriously compromises the system's ability to maintain a cellular connection with the required signal quality, (4) to allow the subscriber to take appropriate action within the present cellzone in order to avoid dropping the cellphone connection and (5) to provide cellphone location reporting to facilitate decision making by a cellular service provider.

SUMMARY OF THE INVENTION

These needs are met by the invention, which provides a system that may be local or global for automatically tracking the movements of a plurality of cellphone subscribers from one cellzone to another. The invention might be characterized as "Where Am I?". A cellphone system carried by a subscriber (or the subscriber's vehicle) includes a Satellite Positioning System (SATPS) antenna and receiver/processor and carries a transmitter that uses a preselected frequency not within the cellular transmission bands. The SATPS receiver/processor includes an electronic map with the coordinates of the boundary curves of each cellular exchange or cellzone within a selected region R, which region can be a portion or all of a town, city, county, state, country or continent.

Each time the subscriber crosses such a boundary curve, from a first cellzone to a second cellzone, a cellular telephone service provider in one or both of these cellzones is advised of the subscriber's new cellzone location. When a telephone caller seeks to reach a cellular phone subscriber, the initial inquiry is directed to a central cellular station, such as a mobile cellular telephone switching office (MCTSO) that communicates with all cellular phone exchanges within the region R. The central MCTSO transmits or broadcasts an inquiry and is informed of the cellzone in which the subscriber is presently located. The central MCTSO need not separately inquire about the present location of a given subscriber or estimate the subscriber's present location from recent cellphone calls, if any, made or received by the subscriber. Because each of two cellzones is aware of the subscriber's present cellzone, loss or compromise of this information by one of these cellzone service providers does not preclude response to the central MCTSO's inquiry by the other cellzone service provider.

The central MCTSO receives a response, identifying the cellzone where the subscriber is presently located, and patches the call through from the telephone caller to the subscriber in this cellzone. This system can also be used to automatically provide a cellular system with information on the present cellzone location of a vehicle that has been moved without authorization, without requiring the vehicle owner to first inquire about the missing vehicle's location. The time a vehicle last crossed a boundary between two adjacent cellzones can also be noted, to provide a time stamp indicating the relative "staleness" of this cellzone information. The cellzone in which the vehicle is presently located is identified. In an urban setting, the cellzones may be relatively small, as small as a few urban blocks on a side.

The system determines the present location and velocity vector for an "engaged" cellphone subscriber (assumed here to be initiating or already engaged in a cellphone conversation or cellphone data transfer) at a sequence of times and uses this information to determine a most likely ("Nearest") cell boundary that the subscriber will next cross, given the subscriber's present location and velocity vector. More particularly, the system: (1) determines the ("Nearest") boundary of the present cell, given the subscriber's present location and velocity; (2) estimates the distance to this Nearest cell boundary; (3) estimates the elapsed time before the subscriber will reach the Nearest cell boundary; (4) advises the subscriber of the time remaining before this Nearest cell boundary is crossed; (5) advises the subscriber whether an unused cellular frequency pair is presently available, or likely to be available, when the subscriber passes across a Nearest cell boundary from the present cell into a most likely handoff cell; and (6) assists in making other call management decisions. Location of the cellphone may use any location determination ("LD") system, not necessarily limited to SATPS.

If an unused cellular frequency pair is not presently available, or is unlikely to be available, the engaged subscriber has the options of: (1) continuing to travel in the present direction, passing across the cell boundary and accepting a risk that the engaged subscriber's telephone conversation is abruptly dropped; (2) reducing the subscriber's speed of approach toward the Nearest cell boundary and bringing the telephone conversation to a graceful conclusion; (3) adopting a path change, such as the optimal path change $\Delta r(new;opt)$, that allows the subscriber time to bring the telephone conversation to a graceful conclusion; and (4) arresting the subscriber's approach toward the Nearest cell boundary, either by reducing the subscriber's speed to zero or by changing the subscriber's velocity vector so that the Nearest cell boundary is not crossed.

The system also monitors actual strength of cellular signals received from the present or host cell site station and from adjacent, potential handoff cell sites, using time division multiplexing or a second channel receiver, and estimates whether the cellular signal strength received from the present cell site for the present cellular connection will be at least equal to a selected signal strength threshold at and near a Nearest cell boundary, within the present cell. If the answer to this question is "yes," the system operates as described in the preceding development. If the answer to this question is "no," the system: (1) estimates the amount of time remaining, given the present location vector and velocity vector of the cellphone user, before the strength of the cellular signal for the present cell site drops below threshold; (2) advises the engaged subscriber that the cellular signal strength will soon drop below threshold; (3) searches for and identifies an adjacent cell site, if any exists, that is estimated to provide an above-threshold cellular signal strength at and near the Nearest cell boundary within the present cell and that presently has an available cellular frequency pair for use by the subscriber; (4) switches the cellular connection from the present cell site to an adjacent cell site identified in (3), if one exists; and (5) if no adjacent cell site exists with an acceptable signal strength, advises the subscriber to take appropriate action to restore the signal strength in the present cell site to an acceptable level.

This system can also be used to relieve a situation in which a severe overload in cellular service demand has developed in a given cellzone, by dynamically changing the cellzone boundary curve(s) between the given cellzone and at least one adjacent cellzone.

DETAILED DESCRIPTION OF THE INVENTION

Figure 1:
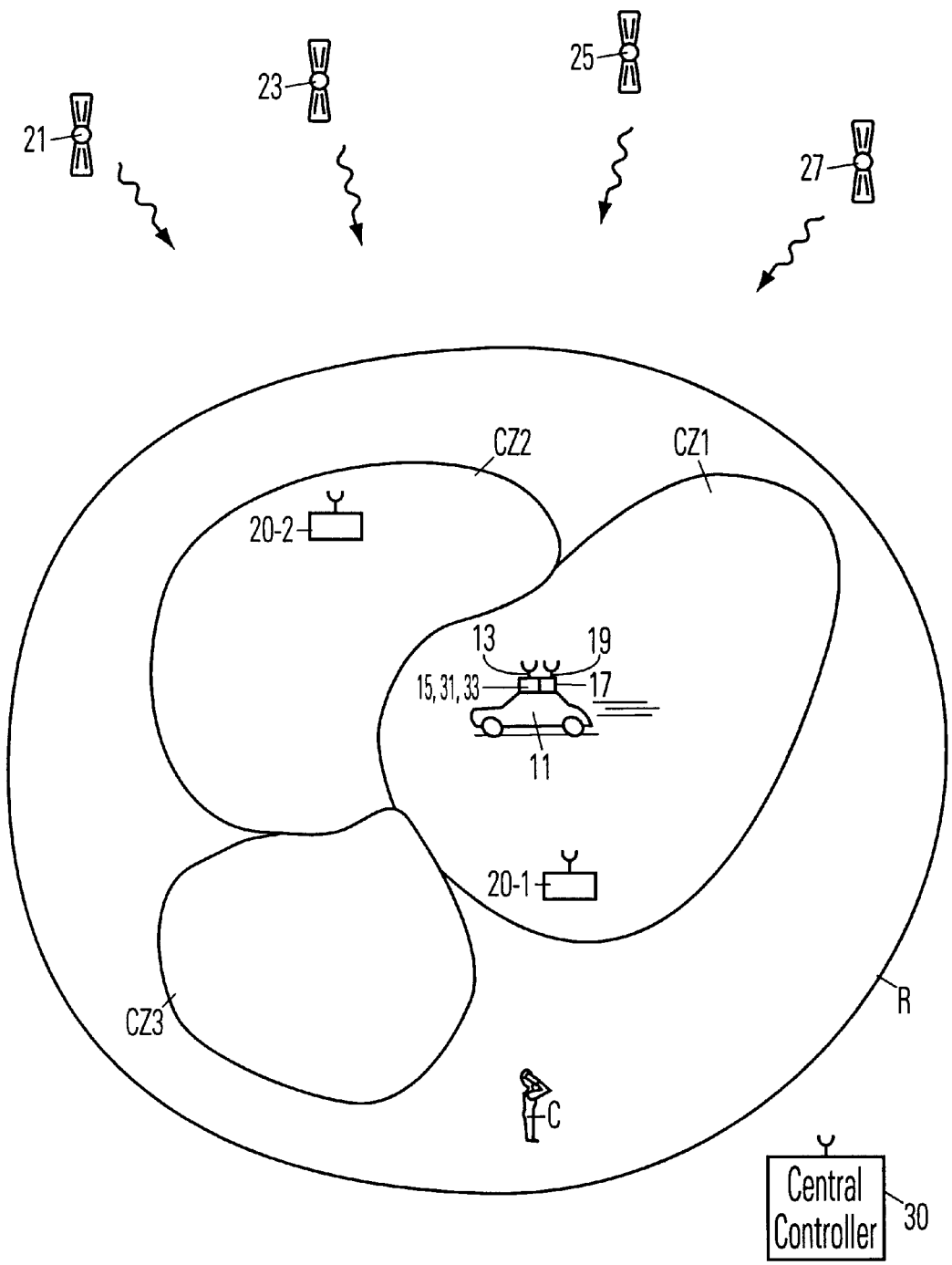
FIG. 1 illustrates use of the invention in a cellular communications environment.

In FIG. 1, a land or marine vehicle 11 or other unit carrying a mobile cellular telephone user, moving within a cellzone CZ1 contained in a larger region R, carries a Satellite Positioning System (SATPS) antenna 13 and associated SATPS receiver/processor 15 that receive and analyze SATPS signals transmitted by four or more SATPS satellites 21, 23, 25 and 27. An SATPS signal received by the antenna 13 and receiver/processor 15 is first identified according to the SATPS satellite that transmitted this signal. The pseudorange or (uncorrected) measured distance from this satellite to the vehicle 11 is determined by determination of the time elapsed from signal transmission by the satellite to signal receipt by the antenna, using well known principles of analysis for satellite-based location determination by a Global Positioning System (GPS) or a Global Orbiting Navigational Satellite System (GLONASS). The GPS and GLONASS location determination systems are discussed below in some detail.

If, as here, the antenna 13 continuously receives SATPS signals from four or more satellites, the associated receiver/processor 15 can determine the present location coordinates and time of observation of the antenna when these signals are received. The vehicle or mobile cellphone user 11 carries a cellular telephone module 17, including a cellphone antenna/ transmitter 19 that can communicate with cellular phone service providers 20-1 and 20-2 for the cellzones CZ1 and CZ2, respectively. The vehicle also carries a microcomputer 31 and associated memory 33, which can be part of the receiver/processor 15, that is provided with an electronic map of the region R in which the vehicle operates. This electronic map deliniates the boundaries of a plurality of nearby cellzones CZ1, CZ2, CZ3, etc. in the region R, using SATPS-defined cellzone boundary coordinates that are part of the electronic map.

Figure 2:
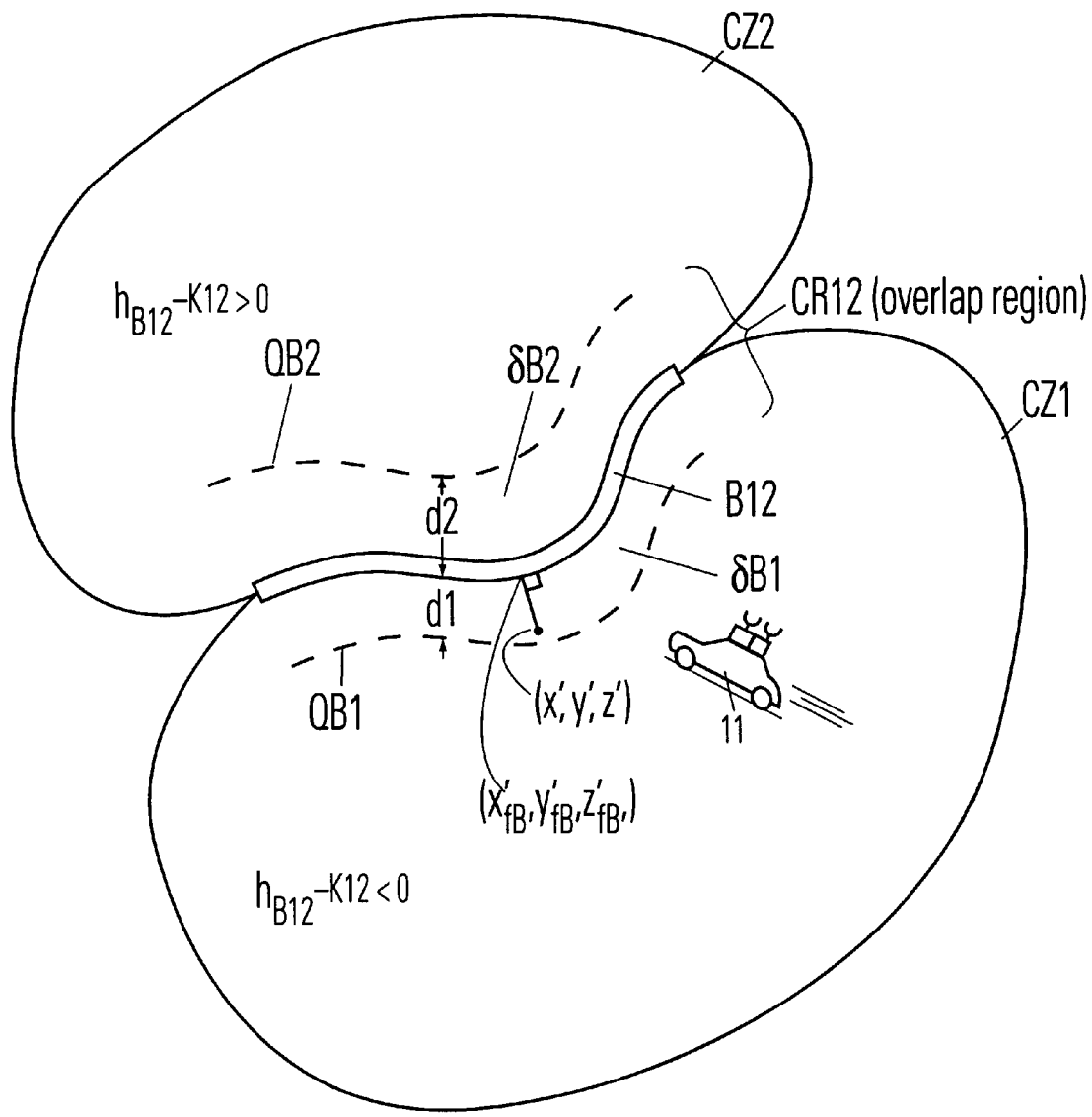
FIG. 2 illustrates some of the geometric configurations useful in determining when a vehicle crosses a cellzone boundary.

In FIG. 2, the vehicle or mobile cellphone user 11 approaches a portion of a boundary curve B12, which is preferably a closed curve that bounds a cellzone CZ1 and separates this cellzone from an adjacent cellzone CZ2. The cellzones CZ1 and CZ2 are preferably contiguous so that all points in a neighborhood of the boundary curve B12 belong to the cellzone CZ1, to the cellzone CZ2, or to both cellzones. The boundary curve B12 may be a single continuous or connected curve (not necessarily closed) or may be a collection of two or more continuous curve components. With the exception of points on the boundary curve B12, the cellzones CZ1 and CZ2 are preferably mutually exclusive and non-overlapping.

The boundary curve B12 is defined in the electronic map stored in the memory 33 by a collection of points in R with spatial location coordinates (x,y,z) that satisfy an equation $$h_{B12}(x_{B12}, y_{B12}, z_{B12}) = K12 \text{(constant)}, \tag{1}$$

and the receiver/processor 15 compares the present location of the antenna 13 with this collection of boundary location coordinates at a sequence of times, using the SATPS-determined location coordinates of the antenna. The constant K12 may be zero or non-zero. Two quasi-boundary curves QB1 and QB2 are defined with reference to the boundary curve B12 and are located distances d1 and d2, respectively, from the boundary curve B12 but on opposite sides of the curve B12. The distances d1 and d2 may be the same or may be different and may each lie in a range from 10 M (meters) to a few hundred M, depending in part on the size of the cellzones CZ1 and CZ2. The quasi-boundaries QB1 and QB2 are also defined by collections of points with spatial location coordinates $(x_{QBi}, y_{QBi}, z_{QBi})$ (i=1, 2) in the electronic map stored in the memory 33. Preferably, the distance $d_{min}=\min(d1, d2)$ is much less than the statistically defined $2\sigma$ inaccuracy associated with the present location coordinates of the SATPS antenna 13. The distances d1 and/or d2 can be different for boundary curves between different cellzones.

Let $\delta Bi$ denote the one-sided region between the boundary curve B12 and the quasi-boundary curve QBi (i=1, 2), which region locally has a width of di. The regions $\delta B1$ and $\delta B2$ together with the boundary curve B12 may be considered to be an overlap or common region CR12 between the contiguous cellzones CZ1 and CZ2, where each of two cellular phone service facilities can serve a cellphone user. The overlap or common region CR12 may include the regions $\delta B1$ and $\delta B2$ and the boundary curve B12. As a cellphone user moves from the non-overlap portion CZ1' (points in CZ1 but not in CR12) of the cellzone CZ1 through the common region CR12 to the non-overlap portion CZ2' (points in CZ2 but not in CR12) of the cellzone region CZ2, the cellular service facility for cellzone CZ1 will at some point hand off the responsibility for providing cellular service for thus user to the cellular service facility for the cellzone CZ2, in a well known manner.

Each point with coordinates (x,y,z) within the region $\delta Bi$ (i=1,2) has at least one "perpendicular foot" on the boundary curve B, with coordinates $(x_{fB}, y_{fB}, z_{fB})$, for which $$\min(x',y',z') \epsilon B\ [(x'-x)^2+(y'-y)^2+(z'-z)^2]^{1/2}=[(x-x_{fB})^2 +(y-y_{fB})^2+(z-z_{fB})^2]^{1/2} \tag{2}$$

A perpendicular footer of a point, with spatial location coordinates (x',y',z'), on a curve B12 is a point, with spatial location coordinates $(x'',y'',z'')=(x'_{fB},y'_{fB},z'_{fB})$, on the curve B12 such that a line drawn between the points with coordinates (x',y',z') and (x'',y'',z'') is perpendicular to the curve B12, or has the shortest distance to the curve B12, at the point of intersection (x'',y'',z'') on the curve B12. A point, such as (x',y',z'), may have one or many perpendicular footers on a given curve, such as B12, if the curve is smooth. Here, the two constraints $$h_{B12}(x,y,z)-K12<0, \tag{3}$$

$$d_{fB}(x,y,z)=[(x-x_{fB})^2+(y-y_{fB})^2+(z-z_{fB})^2]^{1/2}<d1, \tag{4}$$

together imply that the point with location coordinates (x,y,z) lies in the interior of the region $\delta B1$; and the two constraints $$h_{B12}(x,y,z)-K12>0, \tag{5}$$

$$d_{fB}(x,y,z)=[(x-x_{fB})^2+(y-y_{fB})^2+(z-z_{fB})^2]^{1/2}<d2, \tag{6}$$

together imply that the point with location coordinates (x,y,z) lies in the interior of the region $\delta B2$.

Assume, for the sake of definiteness, that the vehicle or mobile cellphone user 11, with spatial location coordinates (x(t),y(t),z(t)) that can change with increasing values of the time variable t, passes through the region δB1 before the vehicle passes across the boundary curve B12 and into the region δB2. As the vehicle 11 passes across the quasi-boundary QB1 and into the interior of the region δB1, the receiver/processor 15 determines the present location coordinates (x(t),y(t),z(t)) of the vehicle and the coordinates $(x_{fB}(t),y_{fB}(t),z_{fB}(t))$ of the perpendicular footer of the vehicle location on the boundary B12 and determines that these two coordinate triples satisfy Eq. (3) and (4).

If the perpendicular footer distance $d_{fB}(x(t),y(t),z(t))$ is decreasing with increasing values of the time variable t, the receiver/processor 15 senses that the vehicle is heading toward, and will probably cross, the boundary curve B12. In this instance, the receiver/processor readies itself for an imminent change of cellzone as the signum of the location variable $h_{B12}(x(t),y(t),z(t))-K12$ changes from negative to positive (or from positive to negative). If the perpendicular footer distance $d_{fB}(x(t),y(t),z(t))$ is increasing with increasing values of the time variable t, the receiver/processor 15 senses that the vehicle is heading away from the boundary curve B12. In this instance, the receiver/processor 15 senses that the vehicle 11 will not soon cross the boundary curve B12 and that no change of cellzone is imminent.

When the vehicle or mobile cellphone user 11 first crosses the quasi-boundary curve QB1 into the region δB1 from the non-overlap portion CZ1' of the cellzone CZ1 and heads toward the boundary curve B12, the SATPS receiver/processor 15 senses this development, activates the cellphone transmitter 19, and causes the cellphone transmitter to communicate this information to the cellular service provider 20-1. The first cellular telephone service provider 20-1 communicates this information to the second cellular telephone service provider 20-2 so that a cellular telephone service handoff to the second service provider 20-2 can be arranged. This handoff can occur at any time the vehicle 11 is within the overlap or common region CR12, but it is preferable for this handoff to occur within the region δB2, after the vehicle has crossed the boundary curve B, or near or at the boundary curve B12. The first and second service providers 20-1 and 20-2 each enter this transaction in their respective ledgers, replacing any earlier transactions involving the location of the vehicle 11: The vehicle has left the cellzone CZ1 and has subsequently entered the cellzone CZ2. Alternatively, or additionally, a central mobile cellular telephone switching office (MCTSO) 30 (FIG. 1) can be notified directly or indirectly when the vehicle 11 leaves the cellzone CZ1 and passes into the cellzone CZ2, including an indication of which cellzone the vehicle has last entered. The formalism described here extends to any two adjacent cellzones, such as CZ1 and CZ3, or CZ2 and CZ3, in FIG. 1.

If the vehicle or mobile cellphone user 11 does not subsequently leave the cellzone CZ2, and if a telephone caller later seeks to contact the cellphone in this vehicle, the central MCTSO 30 will broadcast an inquiry and will be informed by the first service provider 20-1 and/or by the second service provider 20-2 that the vehicle 11 and associated cellphone is (or is believed to be) in the cellzone CZ2. The central MCTSO 30 will then cause the telephone caller to be connected, through the second service provider 20-2, to the target cellphone in the vehicle 11 in the cellzone CZ2. Alternatively, if the central cellular station 30 has already been notified of the movement of the vehicle 11 from cellzone CZ1 to cellzone CZ2, the central MCTSO 30 can consult its own records and can determine the cellzone where the vehicle 11 is believed to be presently located.

As an additional feature, the central MCTSO 30 can maintain a log of the M vehicles or mobile cellphone users, such as 11 (M a large, fixed, positive integer), most recently located by SATPS signals within the cellzones and within a selected time interval, such as Δt(cache)=12 hours. If, within the selected time interval, a selected caller seeks to reach the cellular communications device within a selected vehicle, the central MCTSO 30 first consults its cache or list of recent cellular telephone contacts and determines if this selected caller is included on its the central station's cache or list; if this target vehicle is included on the cache or list, the central MCTSO 30 uses the cellzone for this target vehicle shown by the most recent cellular telephone contact, notifies an appropriate cellzone service provider, and attempts to provide cellular communication between the selected caller and the target vehicle. Operated in this way, the list of locations of the (at most) M most recent cellphone contacts is similar to a cache operating as a separate, fast-acting memory unit in a computer. The number M of cellular telephone contacts in the cache or list may be made so large that the only practical limit on the number of most recent cellular telephone contacts included in the cache or list is the time interval length Δt(cache) chosen.

Figure 3A:
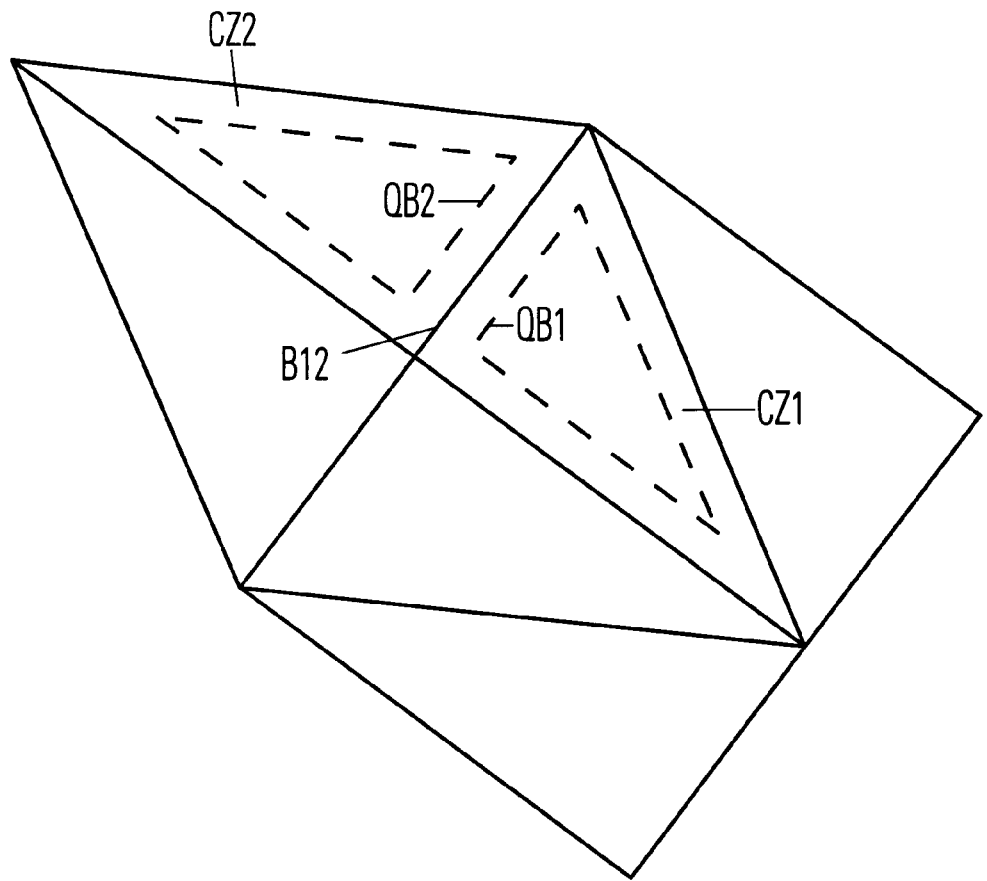
FIGS. 3A, 3B, 3C and 3D illustrate particular boundary curves and quasi-boundary curves that can be used for the invention.
Figure 3B:
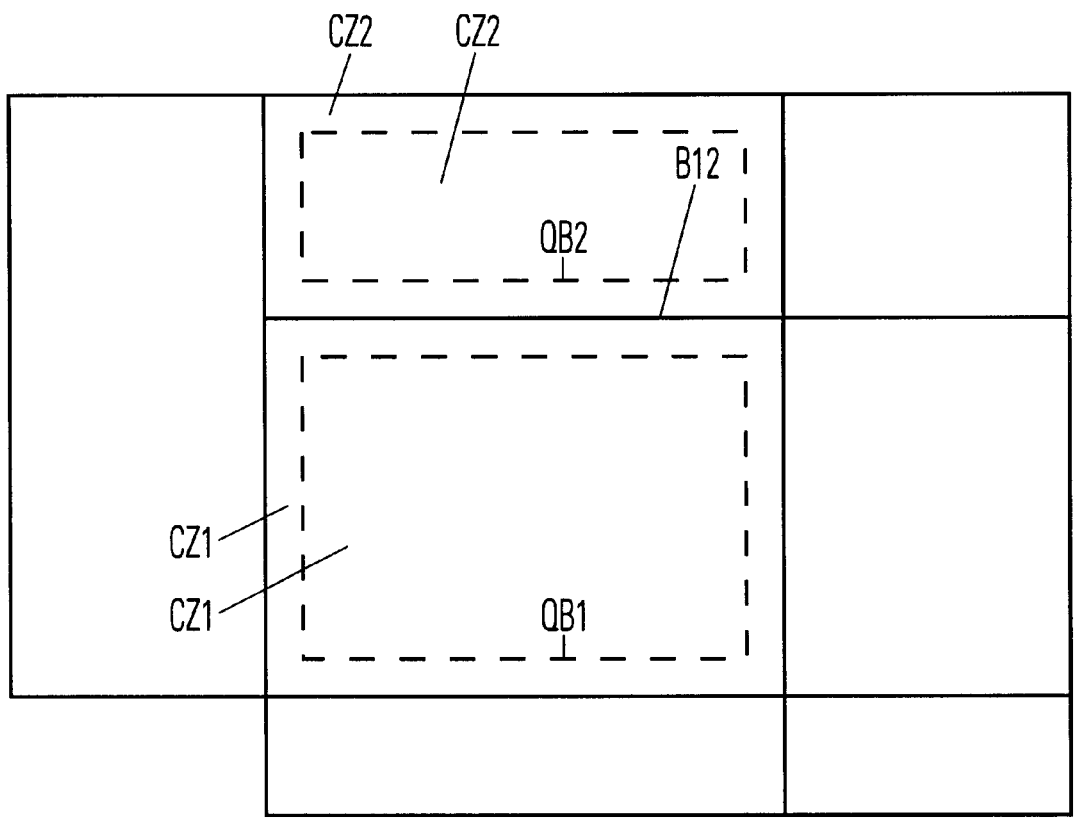
Figure 3C:
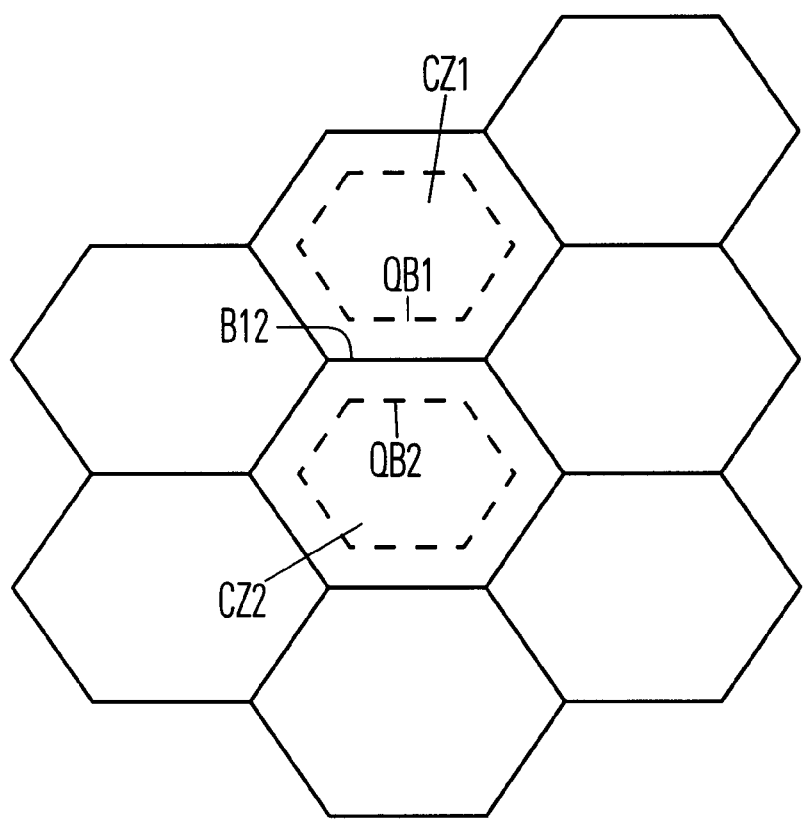

FIGS. 3A, 3B and 3C illustrate the use of regular or irregular triangles, rectangles and regular hexagons, respectively, as boundary curves B12 of cellzones in a tesselization of a region of a plane or other two-dimensional surface. Each closed dotted curve QB, representing a quasi-boundary, within a cellzone thus defined can be chosen to be the same shape as the boundary curve B12 here; and the distance d between each linear segment of a quasi-boundary curve QB and the corresponding linear component of the defining boundary curve B12 is the width of that portion of the quasi-boundary region δB.

Figure 3D:
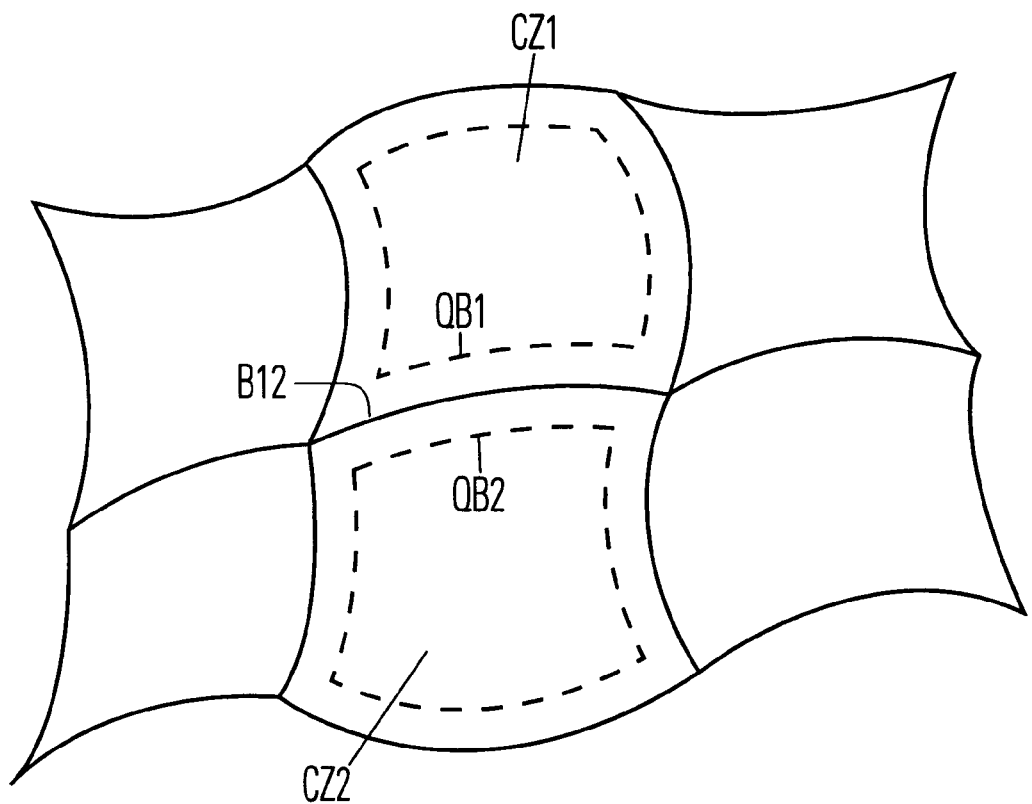

Alternatively, a region of a plane or other two-dimensional surface can be decomposed into cellzones CZi (i=1, 2, ... ) by a sequence of closed curves, each of which includes one, two or more curvilinear segments. FIG. 3D illustrates use of such patterns where the curvilinear segments are portions of circles, ellipses and general ovals. More general boundary curves B12 can also be used here. Preferably, the vehicle relies on a differential SATPS to determine its present location. Differential SATPS, which is discussed below, provides greater accuracy than ordinary SATPS in location determination.

Figure 4:
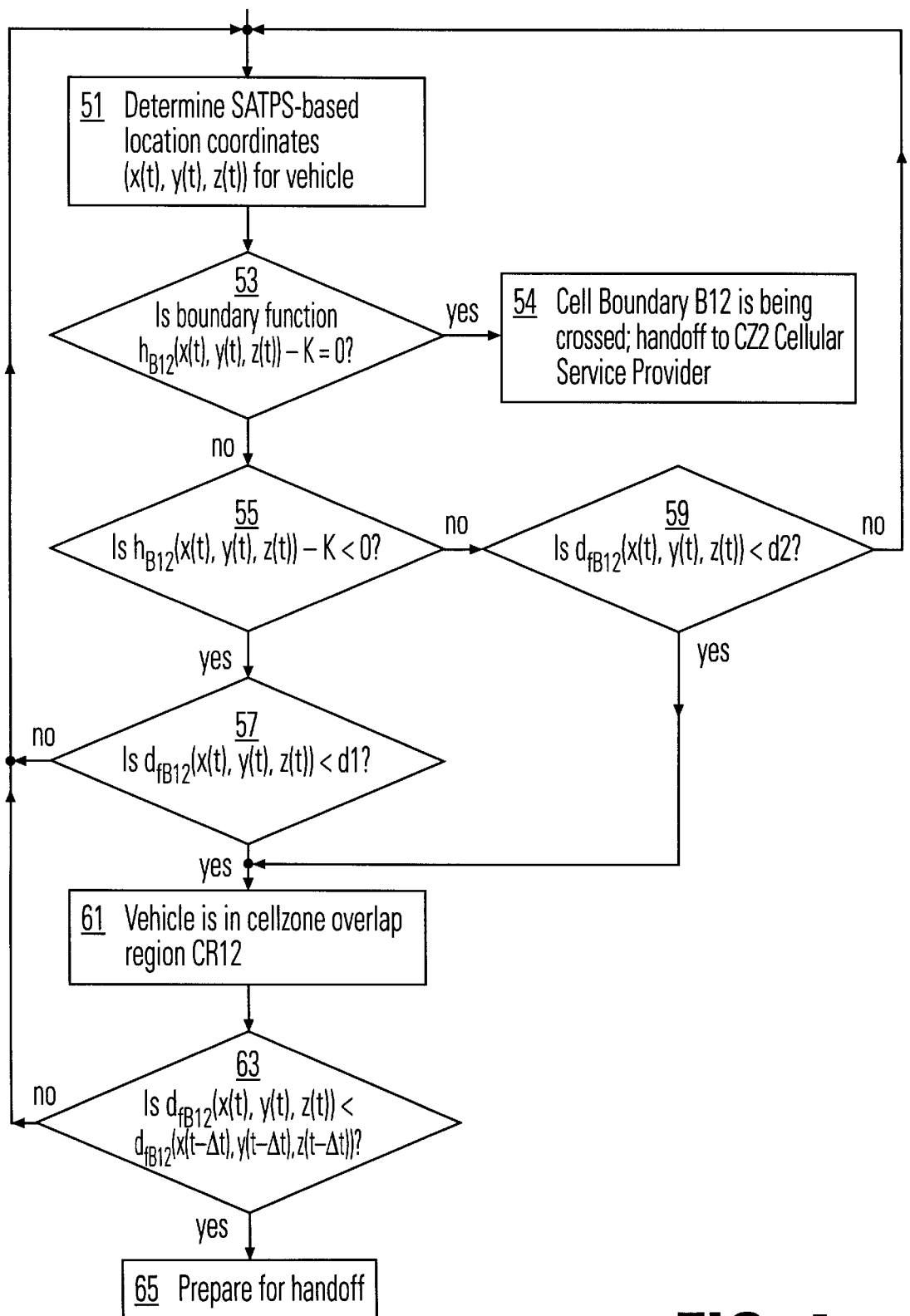
FIGS. 4 and 5 are flow charts illustrating embodiments of the invention for tracking a mobile cellular user across one or more cellzone boundaries.

FIG. 4 is a flow chart illustrating the cellzone notification procedure discussed above. In step 51, the system determines SATPS-based present location coordinates (x(t),y(t),z(t)), as a function of time t, for a cellphone user carrying cellphone/SATPS apparatus constructed and operated according to the invention. The system determines which cellzone the cellphone user is presently located in and calls up the collection of boundary curves for that cellzone. In step 53, the system determines whether a boundary function $[h_{B12}(x(t),y(t),z(t))-K12]$ for any boundary curve such as B12 of that cellzone for is zero (or more generally satisfies $|h_{B12}(x(t),y(t),z(t))-K12| \leq \epsilon$ for a selected small number $\epsilon$). If the answer is "yes", the system proceeds to step 54, where the system concludes that a cellzone boundary is being crossed: the cellzone indicium is changed and handoff to a cellular telephone service provider for the new cellzone is implemented.

If the answer is "no", the system proceeds to step 55 and inquires if each boundary curve function $h_{B12}(x(t),y(t),z(t))-K12 < 0$ (or, more generally, whether $h_{B12}(x(t),y(t),z(t))-K12 < -\epsilon$)? All boundary curve functions for a particular cellzone will be <0 if the vehicle is located within that cellzone.

If the answer in step 55 is "yes", the system proceeds to step 57 and inquires if the perpendicular footer function $d_{fB}(x(t),y(t),z(t))$ is <d1 for the present spatial location coordinates (x(t),y(t),z(t))? If the answer in step 57 is "yes", the system proceeds to step 61 and concludes that the cellphone user present location is in a cellzone overlap region CR12, discussed above. If the answer in step 57 is "no", the system concludes that the cellphone user present location is not in a cellzone overlap region CR12 but is within the original cellzone CZ1, and the system returns to step 51 for analysis of the next present spatial location coordinates of the cellphone user.

If the answer in step 55 is "no", the system concludes that $h_{B12}(x(t),y(t),z(t))-K12>0$ (or, more generally, that $h_{B12}(x(t),y(t),z(t))-K K<\epsilon$)so that the cellphone user is not in the original cellzone CZ1. The system then proceeds to step 59 and inquires if the perpendicular footer function satisfies $d_{fB}(x(t),y(t),z(t))<d2$? If the answer in step 59 is "yes" the system proceeds to step 61 as before. If the answer in step 59 is "no", the system concludes that the present location is not in a cellzone overlap region CR12 but is within an adjacent cellzone CZ2, and the system returns to step 51 for analysis of the next present location coordinates of the cellphone user.

From step 61, the system proceeds to step 63 and inquires if the perpendicular footer function $d_{fB}(x(t),y(t),z(t))$ is less than the preceding footer function $d_{fB}(x(t-\Delta t),y(t-\Delta t),z(t-\Delta t))$, where $\Delta t$ is a small positive time increment? If the answer in step 63 is "yes", the system concludes, in step 65, that the cellphone user is approaching a cellzone boundary within a cellzone overlap region, and the system prepares for cellzone change and handoff. After cellzone change and handoff, the system returns to step 51 and the procedure repeats. A given cellular service provider can provide cellular service for more than one cellzone.

This system is also useful if a vehicle 11 containing the cellphone is moved without authorization by the vehicle owner. If the vehicle 11 is moved across one or more cellzone boundaries, the system, unless it is disabled, will automatically notify each cellular phone service provider for a cellzone that is adjacent to a crossed boundary that the vehicle has just entered, or has just left, that cellzone. This procedure creates an electronic trail that indicates the cellzone in which the missing vehicle is presently located. Preferably, the presence of a system that automatically notifies cellular telephone service providers that a cellzone boundary is being crossed should be concealed on the vehicle so that the system is not disabled by whoever unauthorizedly moves the vehicle.

Figure 5:
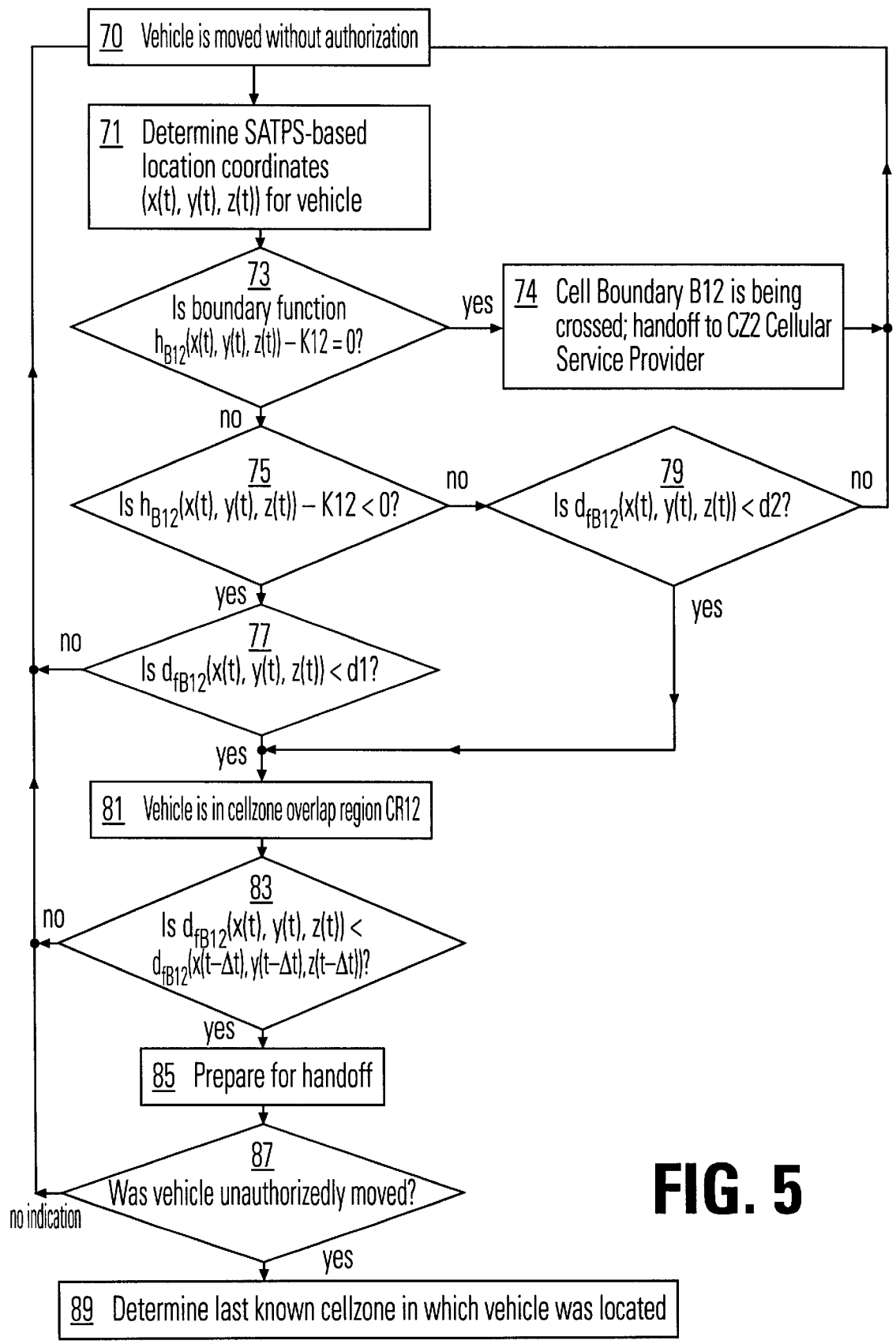

A suitable procedure for use of the invention to determine the present location of a vehicle that may have been unauthorizedly moved is illustrated in FIG. 5, most of whose steps are parallel to the steps of FIG. 4. In step 70, a vehicle is moved without the knowledge or consent of the owner. In step 71, the system automatically determines SATPS-based present location coordinates (x(t),y(t),z(t)), as a function of time t, for a vehicle that carries cellphone/SATPS apparatus constructed and operated according to the invention. The system determines which cellzone the vehicle is presently located in and calls up the collection of boundary curves for that cellzone. In step 73, the system determines whether a boundary function $[h_{B12}(x(t),y(t),z(t))-K12]$ for any boundary curve such as B12 of that cellzone for is zero (or more generally satisfies $|h_{B12}(x(t),y(t),z(t))-K12| \leq \epsilon$ for a selected small number $\epsilon$). If the answer is "yes", the system proceeds to step 74, where the system concludes that a cellzone boundary is being crossed: the cellzone indicium is changed and handoff to a cellular telephone service provider for the new cellzone is implemented.

If the answer is "no", the system proceeds to step 75 and inquires if each boundary curve function $h_{B12}(x(t),Y(t),z(t))-K12 <0$ (or, more generally, whether $h_{B12}(x(t),y(t),z(t))-K12<-\epsilon$)? All boundary curve functions for a particular cellzone will be <0 if the vehicle is located within that cellzone.

If the answer in step 75 is "yes", the system proceeds to step 77 and inquires if the perpendicular footer function $d_{fB}(x(t),y(t),z(t))$ is <d1 for the present spatial location coordinates (x(t),y(t),z(t))? If the answer in step 77 is "yes", the system proceeds to step 81 and concludes that the vehicle present location is in a cellzone overlap region CR12, discussed above. If the answer in step 77 is "no", the system concludes that the vehicle present location is not in a cellzone overlap region CR12 but is within the original cellzone CZ1, and the system returns to step 72 for analysis of the next present spatial location coordinates of the vehicle.

If the answer in step 75 is "no", the system concludes that $h_{B12}(x(t),y(t),z(t))-K12>0$ (or, more generally, that $h_{B12}(x(t),y(t),z(t))-K12 >\epsilon$) so that the vehicle is not in the original cellzone CZ1. The system then proceeds to step 79 and inquires if the perpendicular footer function satisfies $d_{fB}(x(t),y(t),z(t))<d2$? If the answer in step 79 is "yes the system proceeds to step 81 as before. If the answer in step 79 is "no", the system concludes that the vehicle present location is not in a cellzone overlap region CR12 but is within an adjacent cellzone CZ2, and the system returns to step 72 for analysis of the next present location coordinates of the vehicle.

From step 81, the system proceeds to step 83 and inquires if the perpendicular footer function $d_{fB}(x(t),y(t),z(t))$ is less than the preceding footer function $d_{fB}(x(t-\Delta t),y(t-\Delta t),z(t-\Delta t))$, where $\Delta t$ is a small positive time increment? If the answer in step 83 is "yes", the system concludes, in step 85, that the vehicle is approaching a cellzone boundary with a cellzone overlap region, and the system prepares for cellzone change and handoff.

This procedure continues until the vehicle owner (or owner's representative) realizes that the vehicle has been moved without authorization and attempts to determine where the vehicle is presently located. In step 87, the vehicle owner contacts the central MCTSO 30 or other cellular service station and inquires about the present location of the missing vehicle. In step 89, the owner is informed that the vehicle location was last reported in a specified cellzone (e.g., CZ1 or CZ2 or CZ3), and the owner takes action to recover possession of the vehicle. While the owners' request for information on the present location of the missing vehicle is being processed, the central station keeps a present account of the cellzone in which the vehicle is presently located.

If the present spatial location of the vehicle needs to be determnined with greater accuracy, the cellular phone plus GPS system disclosed in U.S. patent application Ser. No. 07/978,272, entitled "Location Of Missing Vehicles" and assigned to the assignee of this application, can be used.

Figure 6:
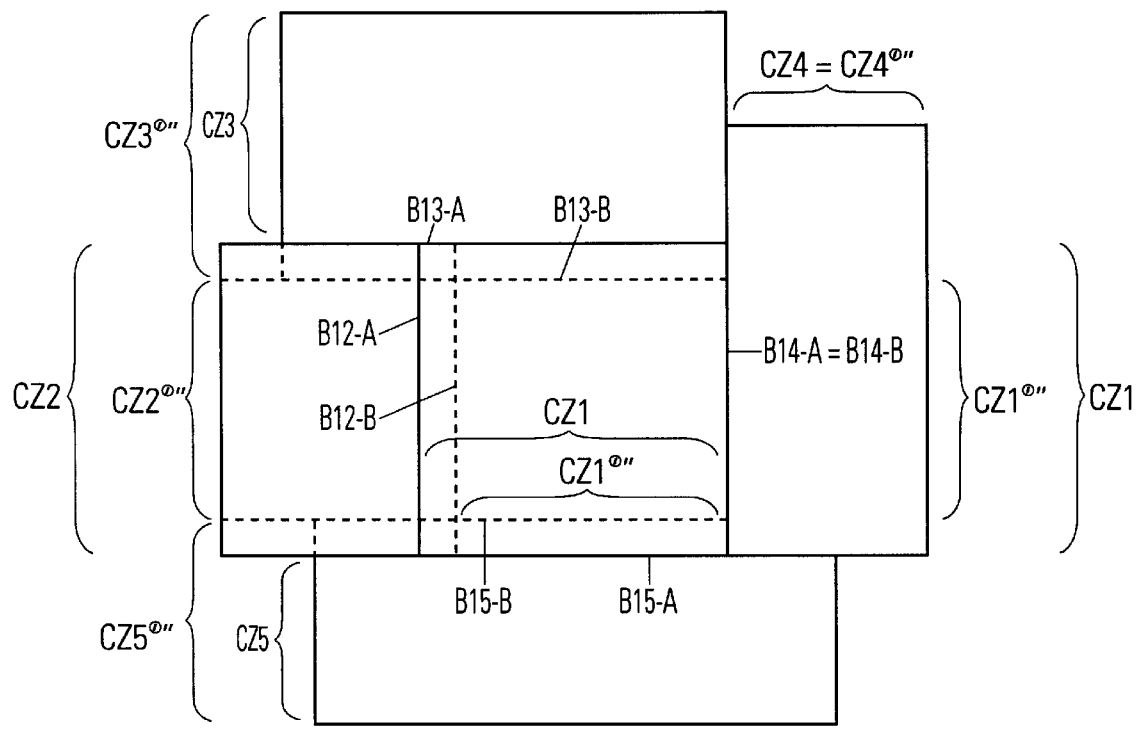
FIG. 6 illustrates use of two alternate sets of boundary curves defining a given cellzone.
Figure 7:
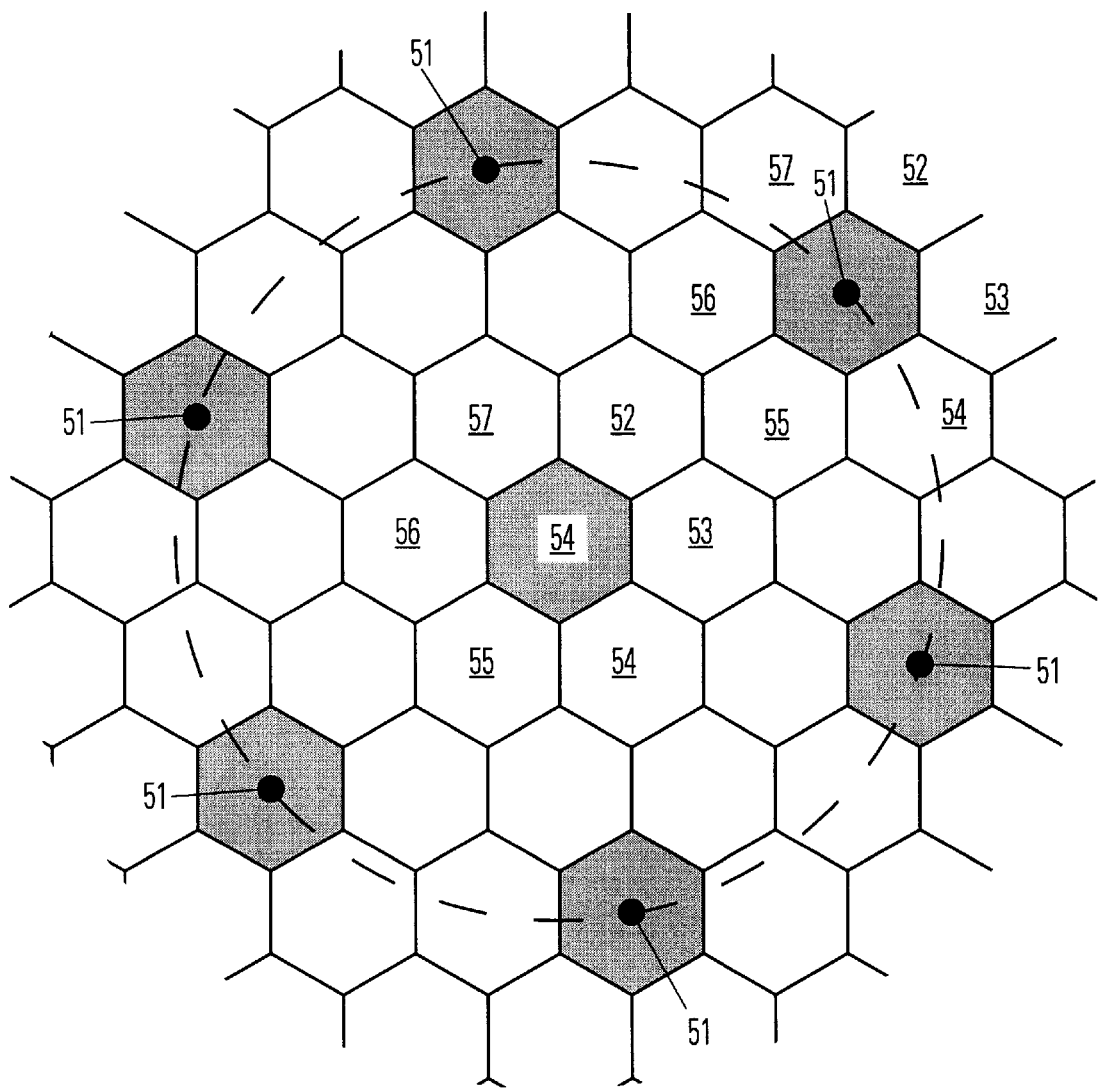
FIG. 7 illustrates one method of allocation of sets of cellular frequency pairs to a group of contiguous cellzones.

If the cellular phone service provider in a target cellzone is currently overloaded with demand for cellular phone service so that the channels are collectively saturated, the boundary curves for the target cellzone can be changed to reduce the area covered by the target cellzone and to partly equalize the load on these cellzones. This usually requires prior negotiation or arrangement with the cellular service providers for cellzones that are contiguous with the target cellzone. Boundary curve collections for a first definition {B12-A, B13-A, B14-A, B15-A} and a second (distinct) definition {B12-B, B13-B, B14-B, B15-B} of the boundary between a cellzone CZ1 and adjacent cellzones CZ2, CZ3, CZ4 and CZ5 in a region R can be included as alternative electronic maps, as illustrated in FIG. 6. Here, for simplicity of illustration, all the cellzone shapes are shown as rectangles. However, the shape of each of the cellzones can be chosen independently, as long as the cellzones in any definition fit together appropriately.

In an exchange of one electronic map for another, a boundary curve for at least two adjacent cellzones is changed to reduce the geographical area covered by one of these cellzones. In most instances, if the boundary curve B12 between cellzones CZ and CZ2 is changed to produce new or alternative cellzones CZ1' and CZ2', one of original cellzones, such as CZ1, will properly contain the corresponding alternative cellzone CZ1', and another alternative cellzone, such as CZ2', will properly contain the corresponding original cellzone CZ2. A cellzone CZ1' is properly contained in a cellzone CZ1 if the cellzone CZ1 contains all points in CZ1 and contains at least one point not in CZ1'.

If cellzone CZ1, whose geographical extent is defined by the boundary curves B12-A, B13-A, B14-A and B15-A in a first electronic map, is found to be in a severe cellular service overload condition, and if the adjacent cellzones CZ2, CZ3, CZ4 and CZ5 are not overloaded, or are not overloaded as severely, the central MCTSO 30 or another cellzone boundary authority notifies the cellular service providers that the boundary curves B12-A, B13-A, B14-A and B15-A are being temporarily replaced by the respective boundary curves B12-B, B13-B, B14-B and B15-B in a second electronic map, in order to (partly) relieve the overload condition extant in cellzone CZ1. This replacement is preferably implemented by replacing the first electronic map by the second electronic map. After this replacement, the cellzone CZ1 has a smaller geographical area and, it is assumed, has fewer mobile cellular units to service within a new or alternative cellzone CZ1'. One or more of the adjacent new or alternative cellzones CZ2', CZ3', CZ4' and CZ5' will acquire additional mobile cellular units to service, as a result of this replacement.

Each of these cellzones then notifies all mobile cellular units presently in any of these cellzones, and any mobile cellular unit that subsequently enters any of these cellzones, that, until further notice, the boundary curves that define the cellzones CZ1, CZ2, CZ3, CZ4 and CZ5 no longer include the boundary curves B12-A, B13-A, B14-A and/or B15-A but include instead the respective boundary curves B12-B, B13-B, B14-B and/or B15-B. Preferably, this notification is implemented by advising such mobile cellular units to replace the first electronic map (A) by the second electronic map (B). Each mobile cellular unit has the electronic map A and the electronic map B in the database of its SATPS receiver/processor or microprocessor or CPU so that this change of boundary curves can be made quickly and efficiently.

Optionally, each cellzone, such as CZ1, has at least three electronic maps, each containing a set of alternate boundary curves that define that cellzone: a first set, for use in normal operations; a second set, for use when that cellzone CZ1 experiences a severe service overload condition; and a third set, for use where an adjacent cellzone experiences a severe cellular service overload condition that is not also experienced by the cellzone CZ1. Preferably, each set of boundary curves has its corresponding set of quasi-boundary curves, as illustrated in FIGS. 2 and 3A–3D. The cellzone boundary curves can be moved back and forth dynamically or "on the fly" as overload conditions develop and are relieved in various cellzones.

Figure 8:
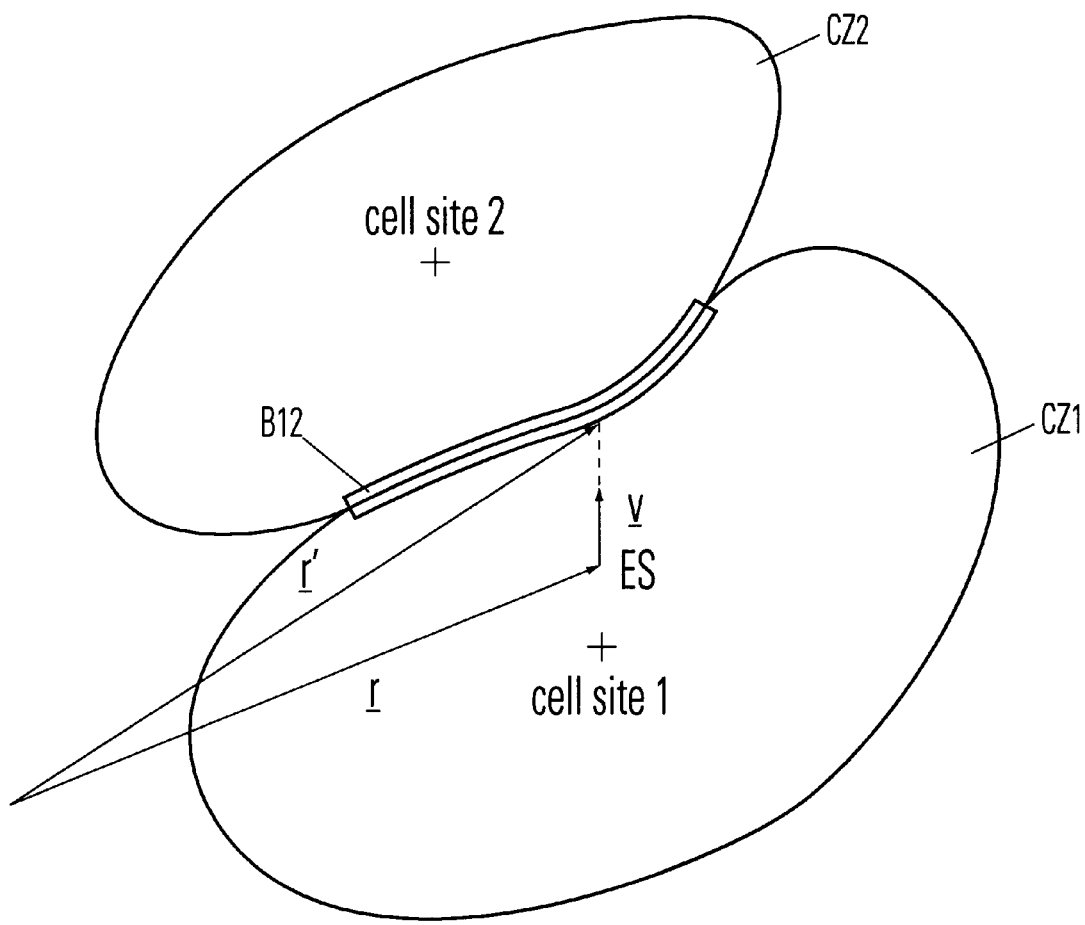
FIGS. 8 and 11 illustrate an application of an embodiment of the present invention.

A map indicating the geographical extent of the various cells serviced by an MTSO can be stored at the MTSO, at one or more cell sites and/or within a cellphone carried by the cellular subscriber, for purposes of location and velocity display and/or decision making. Assume that a cellular subscriber ES, engaged in a telephone conversation, moves toward a Nearest cell boundary B12, with present location vector $r=(x,y,z)$ and present velocity vector $v=(v_x,v_y,v_z)$ in a chosen coordinate system, as illustrated in FIG. 8. The subscriber ES is presently located in the present cell or cellzone CZ1. The present subscriber velocity vector v, if continued, will cause the subscriber to cross the Nearest cell boundary B12 from cell CZ1 into an adjacent handoff cell CZ2 at an estimated boundary location (x',y',z') that is determined by the simultaneous solution of the boundary crossing equations $$h(x',y',z')=h_{B12}(x',y',z')=K12=\text{constant}, \quad (7)$$

$$d'=|r-r'|=\{(x-x')^2+(y-y')^2+(z-z')^2\}^{1/2}=\text{distance from Nearest cell boundary}, \quad (8)$$

$$\Delta t'(\text{cross})=d'/|v|. \quad (9)$$

$$r'=(x40,y',z')=r+v\Delta t'(\text{cross})=(x+v_x\Delta t(\text{cross}),y+v_y\Delta t(\text{cross}),z+v_z\Delta t(\text{cross})), \quad (10)$$

for some determinable time interval length $\Delta t(\text{cross})\geq 0$ before the cell boundary is crossed. Note that these boundary crossing equations do not require that the estimated boundary crossing location (x',y',z') be a perpendicular footer on the boundary curve B12 for the location (x,y,z). In one embodiment of the invention, a system carried by or on the engaged subscriber ES (or the subscriber's vehicle): (1) determines the subscriber present location vector r and the subscriber present velocity vector v, using location determination (LD) signals received from two or more satellite-based LD signal sources 21, 23, 25, 27, such as GPS, GLONASS or LEO satellites, or ground-based towers, such as LORAN; (2) determines the solutions (x',y',z',$\Delta t'$,d') of the boundary crossing equations (7), (8), (9) and (10); (3) optionally identifies the handoff cell CZ2; (4) optionally determines whether one or more pairs of cellular frequencies is, or is likely to be, available to handle the subscriber's presently-ongoing cellular communication in the handoff cell CZ2, and advises the subscriber of the situation in the handoff cell CZ2; (5) optionally visually or audibly displays the subscriber's present location vector r and present velocity vector v relative to the Nearest cell boundary curve B12 and the estimated boundary crossing location vector r'; and (6) visually or audibly advises the subscriber of the estimated time remaining $\Delta t'$ and/or distance remaining d' until the boundary curve B12 is crossed. The most important variable presented here is the estimated time remaining $\Delta t'$, which is preferably in the range 3–30 sec but may be as large as 120 sec, or even larger if desired.

Optionally, the system also (7) advises the subscriber of a new optimum velocity vector v(new;opt) that will optimally increase the time remaining $\Delta t'$ before a Nearest cell boundary, such as B12, is reached. Information on a new velocity vector v(new) can be determined as follows. Using the subscriber present location, given by the vector r, as origin, the system automatically extends a sequence of path change vectors $\Delta r$(new) to the boundary of the present cell CZ1, using a selected sequence of assumed velocity vectors directions, oriented at angles $\theta'$, $\theta''$, etc. to the present direction of the velocity vector v, as illustrated in FIG. 8. For example, 24 path change vectors Δr(new) may be computed at angular intervals that are integer multiples of 15° relative to the direction of the present velocity vector v, optionally including the present direction (indicated by the velocity vector v). Each path change vector Δr(new) has an estimated length, |Δr(new)|, when measured from the origin (location r) to the boundary of cell CZ1. A path change vector Δr(new;opt), with a length |Δr(new)| that is at least as large as the maximum length of these path change vectors, may be selected as the optimum velocity vector, defined by $$v(\text{new;opt}) = |v| \Delta r(\text{new;opt})/|\Delta r(\text{new;opt})|. \quad (11)$$

The optimum velocity vector v(new;opt) has an associated estimated distance d(opt) to the present cell boundary and an associated estimated time Δt(opt) before the cell boundary is crossed, if the subscriber adopts this new velocity direction.

A visual display for the subscriber, engaged or not engaged, may be presented using a graphics monitor or other visual device that displays at least a portion of the Nearest cell boundary B12, the subscriber's present location vector r and present velocity vector v, and the estimated boundary crossing location (x',y',z'). An audible display for the subscriber may be presented in either of two manners: (1) an audible readout of the time remaining Δt' or distance remaining d' until the Nearest cell boundary B12 is crossed; and (2) an audible indicium, such as a sound with a selected audibly perceptible frequency, where the selected frequency increases to a selected upper limit frequency as the Nearest cell boundary B12 is approached.

The engaged subscriber ES then has several options: (i) continue to travel in the present direction, passing across the Nearest cell boundary B12, and accept a risk that the subscriber's telephone conversation is abruptly dropped, (ii) reduce the subscriber's speed of approach |v| toward the Nearest cell boundary B12 and bring the telephone conversation to a graceful conclusion, (iii) adopt a path change, such as the optimal path change Δr(new;opt), that allows the subscriber time to bring the telephone conversation to a graceful conclusion; and (iv) arrest the subscriber's approach toward the Nearest cell boundary B12, either by reducing the subscriber's speed |v| to zero or by changing the subscriber's velocity vector v so that the Nearest cell boundary B12 is not crossed.

If the engaged subscriber ES changes its direction and/or changes its speed, the velocity vector v will change and, with it, the boundary crossing location vector r'=(x',y',z') and/or time remaining Δt' and/or distance remaining d', as determined by the boundary crossing equations (7), (8), (9) and (10). The Nearest cell boundary and handoff cell may also change with a change in the direction of the new velocity vector v(new).

Figure 9:
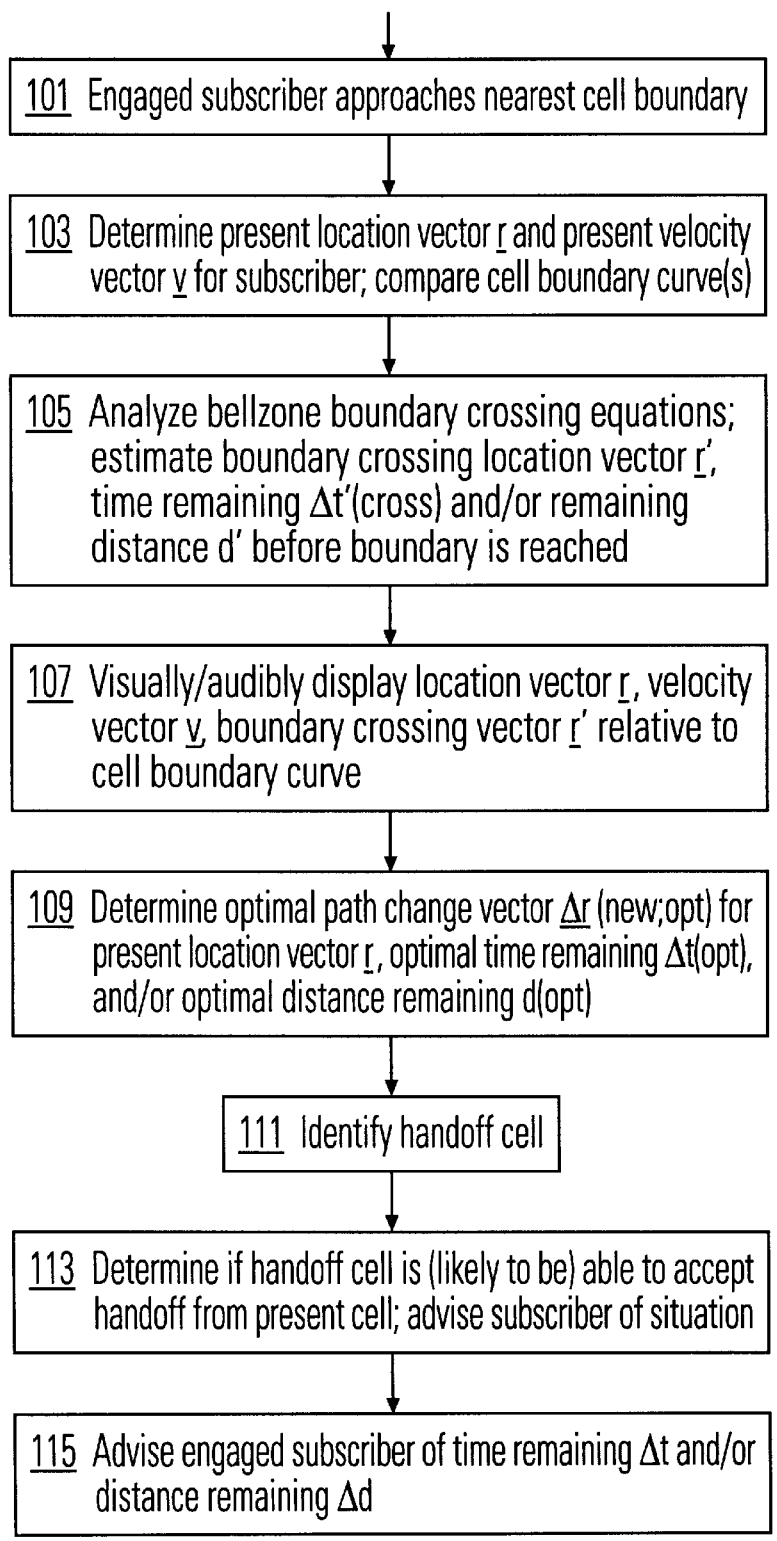
FIGS. 9 and 12 are flow chart illustrating suitable procedures according to the present invention.

FIG. 9 is a flow chart illustrating the embodiments of the invention discussed in the immediately preceding paragraphs. In step 101, an engaged subscriber approaches a Nearest cell boundary B12, for example, by crossing a quasi-boundary curve QB1 (FIG. 2) that lies in the present cell CZ1 but is spaced apart from the Nearest cell boundary B12. In step 103, the system determines the present location vector r and the present velocity vector v for the subscriber (or for the subscriber's vehicle or cellphone). In step 105, the system analyzes the boundary crossing equations, (7), (8), (9) and (10), and estimates the boundary crossing location vector r', the time remaining Δt'(cross) and/or the distance d' remaining before the cell boundary is reached. In step 107, optionally the system visually and/or audibly displays the subscriber's present location vector r and present velocity vector v relative to the Nearest cell boundary curve B12 and the estimated boundary crossing location vector r'. In step 109, the system optionally determines an optimal path change vector Δr(new;opt) at the present location vector r within the cell CZ1 and optionally displays the optimal path change vector Δr(new;opt) and the corresponding optimal time remaining Δt(opt) and optimal distance remaining d(opt), in visually perceptible or audibly perceptible form, for the subscriber. In step 111, the system optionally identifies or displays the handoff cell CZ2 relative to CZ1.

In step 113, the system optionally determines whether one or more pairs of cellular frequencies is, or is likely to be, available to handle the subscriber's presently-ongoing cellular communication in the handoff cell CZ2, and advises the subscriber ES of the situation in the handoff cell CZ2. This step requires the system to communicate with the MTSO, or through the MTSO with the cell site for the handoff cell CZ2, to determine whether one or more pairs of cellular frequencies is, or is likely to be, available to handle the subscriber's presently-ongoing telephone conversation in the handoff cell CZ2. This will normally require use of time division multiplexing or of a second channel on the cellular transmitter/receiver to communicate with the MTSO or with the handoff cell site. In step 115, the system visually or audibly advises the subscriber of the time remaining Δt' (cross) and/or distance remaining d' until the Nearest cell boundary curve B12 is crossed.

As noted above, if an unused cellular frequency pair is not presently available, or is unlikely to be available in the handoff cell, the engaged subscriber ES has the options of: (1) continuing to travel in the present direction, passing across the cell boundary and accepting a risk that the subscriber's telephone conversation is abruptly dropped; (2) reducing the subscriber's speed of approach toward the Nearest cell boundary and bringing the telephone conversation to a graceful conclusion; (3) adopting a path change, such as the optimal path change Δr(new;opt), that allows the subscriber time to bring the telephone conversation to a graceful conclusion; and (4) arresting the subscriber's approach toward the Nearest cell boundary, either by reducing the subscriber's speed to zero or by changing the subscriber's velocity vector so that this Nearest cell boundary is not crossed.

Figure 10:
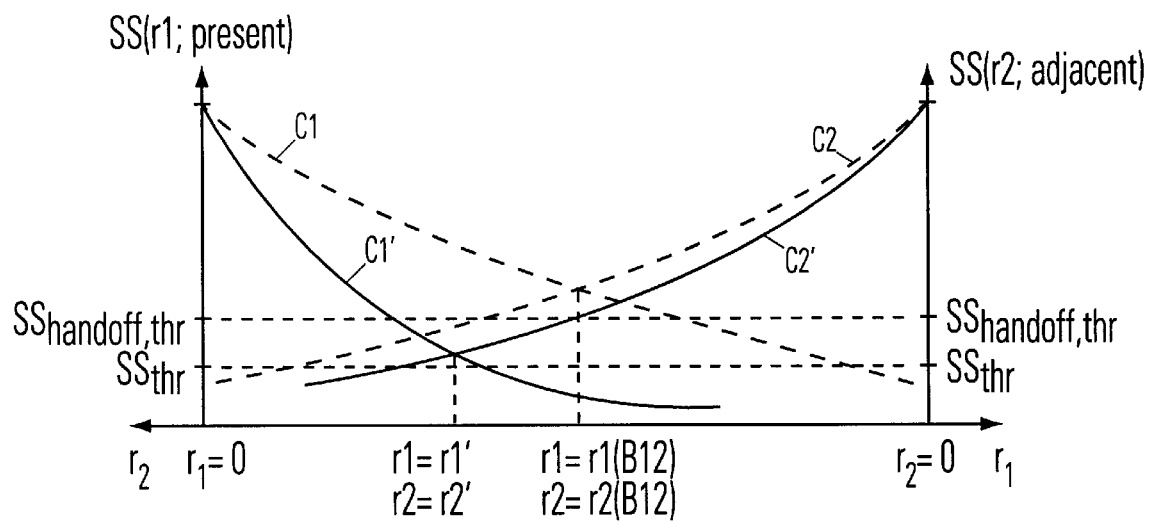
FIG. 10 graphically represents theoretical and actual strengths of signals received from two adjacent cellular base stations.

In some circumstances, the cellular signal strength for the present cellular connection, received from the present cell site, may not stay above a selected strength threshold throughout the present cell. FIG. 10 graphically illustrates how this circumstance may develop. The expected or theoretical cellular signal strength for the present cell site and for an adjacent cell site, represented by the respective curves C1 and C2 in FIG. 10, decrease (C1) and increase (C2) as the user's cellphone approaches a cell boundary between the present cell and an adjacent cell. The ideal cellular signal strengths for the curves C1 and C2 might be represented by an equation such as $$SS(r1;pres) = SS1 \exp(-\alpha 1 \, r1)/r^{p1}, \quad (12)$$

$$SS(r2;adj) = SS2 \exp(-\alpha 2 \, r2)/r^{p2}, \quad (13)$$

$$r1 = |r - R1|, \quad (14)$$

$$r2 = |r - R2|, \quad (15)$$

where r1 and r2 are the respective radial distances of the cellphone from the present cell site (location vector R1) and from the adjacent cell site (location vector R2), SS1 and SS2 are corresponding selected reference signal strengths, p1 and p2 are corresponding selected exponents representing geometric fall-off of cellular signals with radial distance r from the signal source, and α1 and α2 are selected exponential parameters that take account of absorption, dispersion, scattering and other cellular signal attenuation and signal alteration processes in the atmosphere. Ideally, in the absence of multipath signals and other signal attenuation and alteration processes, p1=p2=2 and α1=α2=0. In a realistic situation, p1 and p2 usually independently range between 2 and 5,and α1 and α2 are positive. The parameters SS1, SS2, p1, p2, α1 and α2 are preferably determined experimentally for different cells and different regions within a cell but may be modeled empirically.

If the cellular signal strengths received from the present cell site and from an adjacent cell site behave as shown by the respective curves C1 and C2, cell site handoff could occur at or near the respective radial distances r1=r1(B12) and r2=r2(B12), corresponding to the Nearest cell boundary B12, where the strength of a cellular signal received from each of these two cell sites is comfortably above threshold: (SS(r;cz)>SS$_{thr}$ for cz=present and cz=adjacent). Preferably, handoff occurs at or above a handoff threshold value SS$_{handoff,thr}$>SS$_{thr}$, before the cellular signal strength drops to the threshold value SS$_{thr}$.

However, in some situations the signal strengths SS(r1;pres) and SS(r2;adjacent) for one or both of the two cell sites may follow the respective curves C1' and C2', as shown in FIG. 10, and the present cell site signal strength at the present location r for the subscriber ES may be significantly below the expected signal strength set forth in Eq. (12). In this event, if the measured present cellular signal strength received from the present cell site is SS(r1pr;pres) for the cellphone at its present location (r1=r1pr), the cellular signal strength for increasing values of the radial distance r1 is estimated by the relation $$SS(r1;pres;est)=SS(r1pr;pres)\exp\{-\alpha 1(r1-r1pr)\}(r1pr/r1)^{p1} \quad (16)$$

for r1≥r1pr, and Eq. (16) is used to estimate the value of the strength of the cellular signal that will be received at the Nearest cell boundary B12. If the signal strength constraint $$SS(r1(B12);pres;est) \geq SS_{thr} \quad (17)$$

is satisfied, the system proceeds as discussed in the preceding development.

If the constraint in Eq. (17) is not satisfied, as is illustrated in FIG. for the curve C1', the cellular signal strength for the adjacent cell site for increasing values of the radial distance r2 is first estimated by a relation $$SS(r2;adj;est)=SS(r2pr;adj)\exp\{-\alpha 2(r2-r2pr)\}(r2pr/r2)^{p2}, \quad (18)$$

where SS(r2pr;adj) is the measured signal strength received from the adjacent cell site at the present location r2=r2pr. The system then projects future vector locations r(t;future) for the cellphone, given the present location vector r(t0) and present velocity vector v(t0) at time t=t0for the cellphone, using the estimate $$r(t;future)=r(t0)+v(t0)\cdot(t-t0) \quad (t>t0), \quad (19)$$

and determines the corresponding radial distances r1(t;future) and r2(t;future) from the present cell site and from the adjacent cell site. The system than determines whether at least one location exists, corresponding to r1(t;future)=r1' and r2(t;future)=r2' and t=t$_f$, for which the two constraints $$SS(r1';pres;est) \geq SS_{thr}, \quad (20)$$

$$SS(r2';adj;est) \geq SS_{thr} \quad (21)$$

are simultaneously satisfied, as graphically suggested in FIG. 10. If the two constraints (20) and (21) are simultaneously satisfied, the system prepares to hand off the cellular signal received by the cellphone from the present cell site to the adjacent cell site at a time t≈t$_f$, if a cellular frequency pair is available at the adjacent cell site to handle the switched cellular connection. Note that the radial distances r1=r1' and r2=r2' may correspond to a location within the present cell that is not near the Nearest cell boundary B12.

A cell zone "hole," which is a region within a cell where the signal strength is either below the threshold value SS$_{thr}$ or between SS$_{thr}$ and SS$_{handoff,thr}$, may be present, either temporarily or more or less permanently. In some circumstances, a small region within a cell may develop a transient signal strength hole that appears from time to time but is not permanent. These situations can be identified as they occur and the effects can be avoided or minimized by another embodiment of the invention, as discussed in the following.

Figure 11:
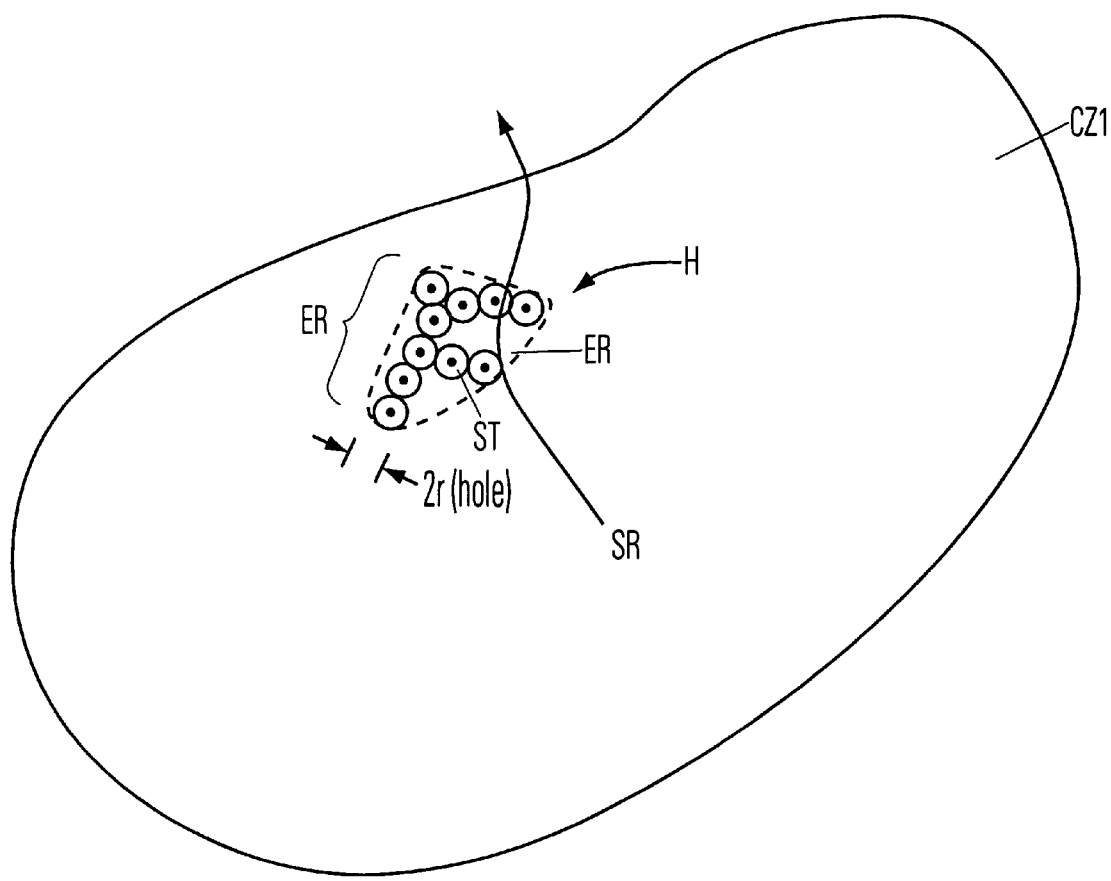

In other situations, the hole may be permanent. For example, in Sunnyvale, Calif., in a region surrounding Sunnyvale-Saratoga Road between Remington Avenue and El Camino Real, the cellular service provided by Cellular One appears to have a permanent signal strength hole, where the signal strength drops quickly to below threshold and cellular connections are sometimes dropped within this region. Presence of a permanent signal strength hole in a cell is, admittedly, not an opportunity for a public relations triumph for the cellular service provider. However, the disagreeable effects of presence of such a permanent hole can be reduced by another embodiment of the invention, as discussed in the following. It is assumed in the following that the present cell site and/or the MTSO receives the location of each engaged subscriber within the cell at reasonably frequent time intervals, such as at one-second intervals.

Where a transient hole develops in a cell, for example in the region H within the present cell CZ1 shown in FIG. 11, the present cell site can or will first learn of this development through one or more dropped cellular connections that occur within the region H. A dropped cellular connection is distinguishable from a graceful (normal) connection termination by where the termination occurs: the cell site itself takes affirmative action to drop the connection where signal strength is below threshold, whereas one or another of the communicating parties takes the affirmative action by going on-hook in a graceful termination. By monitoring cellphone location and return signal strength from its engaged subscribers' cellphones, the present cell site or MTSO determines the location of cellphones that have signal strengths near or below threshold ("sub-threshold") and thereby estimates the extent of a hole region H. Alternatively, for each location corresponding to a monitored signal strength near or below threshold, the present cell site or MTSO can form an ovular (e.g., circular or elliptical) sub-region ST having a selected radius r(hole) that is arbitrarily assumed to also provide sub-threshold return signal strength. If the present cell site monitors return signal strength at time intervals of, say, 1 sec, and if each such monitored return signal is sub-threshold, this will produce a sequence of ovular sub-regions ST that together map out one or more sub-region patterns SP such as illustrated in FIG. 11. An accumulating array of sub-region patterns may be used to estimate the physical extent of a signal strength hole region H within a present cell. A hole sub-pattern, once formed, may be removed after a selected consecutive number N (e.g., N≥2)

of return signal strengths are monitored in that sub-region and found not to be sub-threshold. Adoption of this approach helps the system avoid premature return of part or all of a transient hole region to non-hole status.

Where a more or less permanent hole region H develops within a cell, the physical extent of this hole region can be determined using measurements of return signals from a cellphone that moves from point to point in and around this region.

Once at least three locations within a signal strength hole region H are identified, whether transient or permanent, the cell site estimates the region's physical extent by forming a hole estimate region ER in the cell that contains all these locations. One suitable method for forming the estimate region ER is to form the convex hull of these locations, which is the smallest convex set (two-dimensional or three-dimensional) that contains all the identified hole locations. Each time one or more new hole locations is added to the list of (sub-threshold) locations defining the convex hull, a new convex hull is formed including the old and new locations; the new convex hull will contain the old convex hull, plus possibly other points. The estimate region ER may also be defined in other ways not involving use of a convex hull.

The present cell site or MTSO then identifies each engaged subscriber ES in the present cell whose present location vector r and velocity vector v, if continued, will cause the subscriber location to pass through the hole estimate region ER. When one of these engaged subscriber's location is close to an estimate region ER, the subscriber is notified, visually or audibly or both, of the existence and location the estimate region ER relative to the subscriber's present location (r) and is advised that the cellular signal strength within the estimate region ER will likely drop to a level that will cause the present cellular connection to be dropped. The subscriber can then take any of several appropriate actions, including: (1) avoiding passage through the identified estimate region(s); (2) bringing the present cellular communication to a close before the subscriber enters the estimate region; and (3) passing into and through the estimate region and accepting the risk that the present cellular connection may be dropped. If a cellphone subscriber attempts to initiate an outgoing cellphone call or to respond to an incoming call while the subscriber location is within an estimate region ER, the subscriber can be advised of the location and extent of the estimate region and that a cellular connection cannot be completed while the subscriber location remains within the estimate region ER.

Where an engaged subscriber ES has a present location vector r and a present velocity vector v, the system determines that the subscriber will likely pass through a hole estimate region ER if the following relations are satisfied.

$$d''=|r-r''|=\{(x-x'')^2+(y-y'')^2+(z-z'')^2\}^{1/2}=\text{distance from estimate region boundary,} \quad (22)$$

$$\Delta t''(\text{cross})=d''/|v|. \quad (23)$$

$$r''=(x'',y'',z'')=r+v_x\Delta t''(\text{cross})=(x+v_x\Delta t''(\text{cross}),y+v_y\Delta t''(\text{cross}),z+v_z\Delta t''(\text{cross})), \quad (24)$$

$$h_H(x'',y'',z'')-K=0, \quad (25)$$

where Eq. (25) with K=0 defines the boundary curve(s) δER of the estimate region ER and K<0 in Eq. (25) corresponds to the interior of the estimate region. If the estimated time remaining Δt"(cross) before the estimate region boundary is crossed is less than or equal to a threshold value Δt" (cross;thr) (e.g., 3–30 sec), the system advises the engaged subscriber that the subscriber will soon pass into a hole estimate region and identifies this region.

Figure 12:
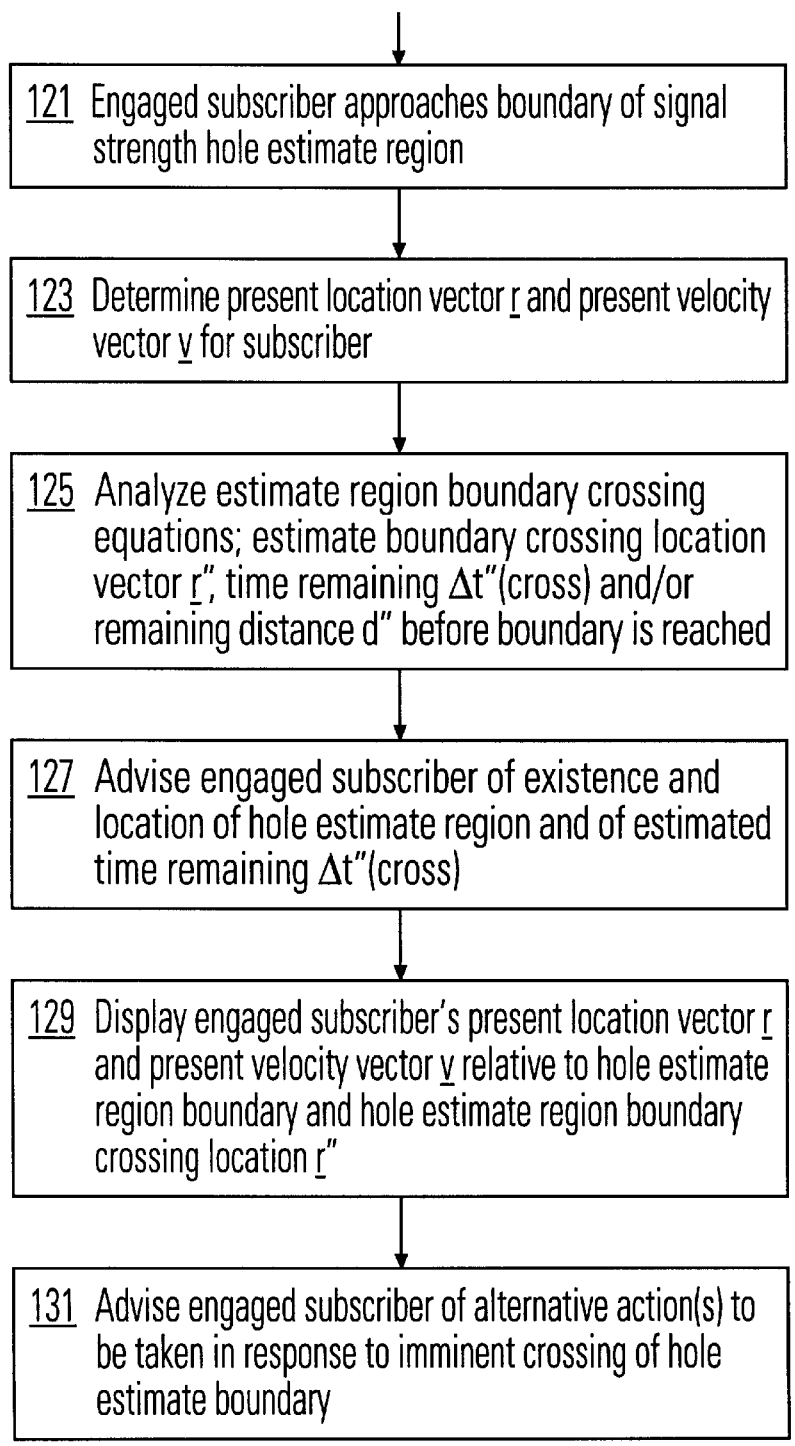

FIG. 12 is a flow chart illustrating the embodiments of the invention discussed in the immediately preceding paragraphs. In step 121, an engaged subscriber approaches an identified hole estimate region boundary δER in the present cell CZ1. In step 123, the system determines the present location vector r and the present velocity vector v for the subscriber (or for the subscriber's vehicle or cellphone). In step 125, the system analyzes the estimate region boundary crossing equations, (22), (23), (24) and (25), and estimates the boundary crossing location vector r", the time remaining Δt"(cross) and the distance d" remaining before the estimate region boundary is reached. In step 127, the system advises the subscriber of the existence and general location of the estimate region ER and of the estimated time remaining Δt"(cross) before the subscriber passes into the estimate region. In step 129, optionally the system visually and/or audibly displays the subscriber's present location vector r and present velocity vector v relative to the hole estimate region boundary curve δER and the estimated boundary crossing location vector r". In step 131, optionally the system visually or audibly advises the subscriber of one or more of the several alternative actions the subscriber can take in response to this imminent boundary crossing.

A cellular subscriber may also enter location coordinates specifying a route SR that the subscriber's vehicle will follow in crossing a certain region, which may include portions of one or more cell, as indicated in FIG. 11. In this situation, the cell boundary crossing equations, (7), (8). (9) and (10), are directly determined, and the system seeks an unused cellular frequency pair only in a cell CZ2, adjacent to the cell CZ1, that contains a portion of the specified route SR that the subscriber has not yet traveled. If a hole estimate region ER is identified within the present cell, the hole estimate region boundary crossing equations, (22), (23), (24) and (25), are directly determined and used only if the specified route SR will pass through a portion of the estimate region.

Figure 13:
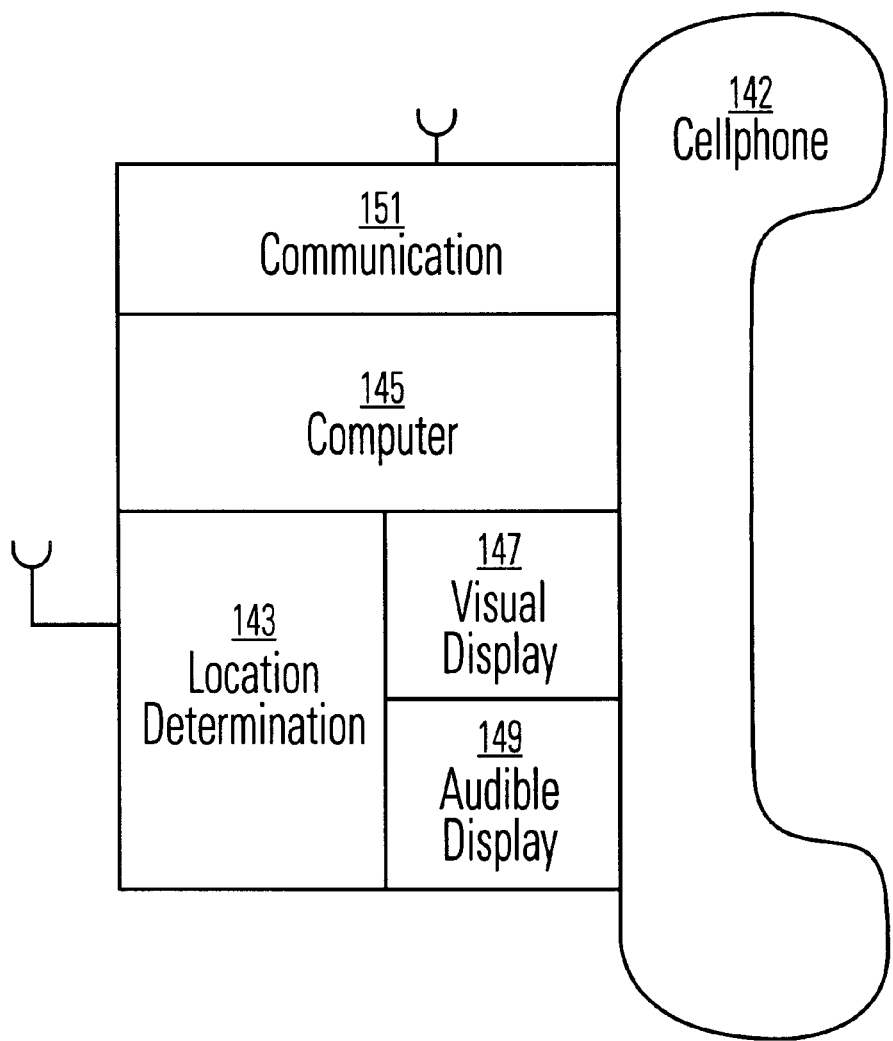
FIGS. 13–14 illustrate apparatus for practicing the present invention.

FIG. 13 schematically illustrates handheld cellular apparatus 140 suitable for practicing the invention and attached to a cellphone 141. The apparatus 121 includes a location determination (LD) module 143 that receives LD signals from two or more LD signal sources (for example, 21, 23, 25, 27 in FIG. 1) and that determines the present location vector r and present velocity vector v for the cellphone. The apparatus 140 also includes a computer 145, which may be part of the LD module 143, that is electronically connected to the cellphone 141 and to the LD module 143 and that senses when the cellphone is engaged in a cellular communication. The LD module 143 or the computer 145 includes an electronically sensible map of the region R, including coordinates of the boundaries between the cells, such as CZ1, CZ2 and CZ3 in FIGS. 1 and 2.

The apparatus 140 optionally includes a visual display 147 and/or an audible display 149 that is attached to the LD module 143 and/or to the computer 145, to display the location vector r and the velocity vector v of the cellphone relative to the Nearest cell boundary, for example, B12 in FIG. 2. The apparatus 140 optionally includes a communications module 151 that communicates with the MTSO, determines whether one or more pairs of cellular frequencies is, or is likely to be, available to handle the subscriber's presently-ongoing cellular communication in the handoff cell CZ2, and advises the subscriber of the situation in the handoff cell, using the display(s) 147 and/or 149.

With reference to the flow chart in FIG. 9: the LD module performs step 101 for the apparatus 141 in FIG. 13 performs step 103; the computer 145 performs step 105; the display(s)

147 and/or 149 performs step 107; the LD module 143 or the computer 145 performs step 109 and step 111; the computer 145 performs step 113; and the computer 145 and/or display 147 and/or display 149 performs step 115. The LD module 143 may receive SATPS signals or other LD signals.

Figure 14:
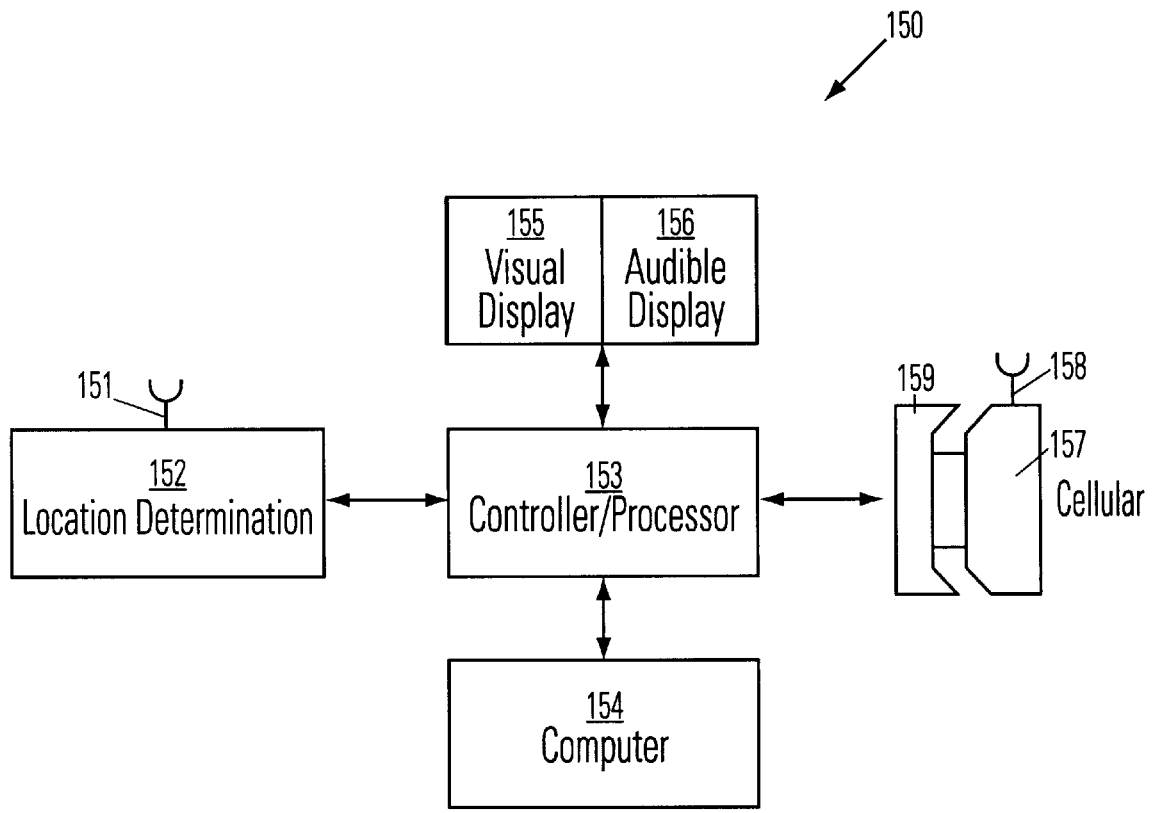

FIG. 14 illustrates cellular apparatus 150 suitable for installation in the dashboard or another suitable location within a vehicle. The cellular apparatus 150 includes an LD module with a LD signal antenna 151 and LD signal receiver/processor that receive and analyze LD signals to determine the present location of the antenna. The LD module issues LD information that is received and processed by a controller/processor 153, assisted by a computer 154 that may be part of the controller/processor. Some signals from the controller/processor 155 are received by a display module 155 and/or 156 (optional) that provides visual and/or audible displays of the location vector r and velocity vector v for the LD antenna 151. The controller/processor 153 also exchanges information with a cellphone 157 that includes a cellular communication antenna 158. The cellphone 157 is optionally plugged into and held by a cellular cradle 159 that communicates with the controller/processor 153. Operation of the cellular apparatus 150 is similar to operation of the cellular apparatus 140.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK-modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, Jul. 3, 1991.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=0, 1, 2, . . . , 23) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential SATPS positioning, is far more accurate than absolute positioning, provided that the distances between these stations are substantially less than the distances from these stations to the satellites, which is the usual case. Differential SATPS positioning can be used for survey or construction work in the field, providing location coordinates and distances that are accurate to within a few centimeters.

In differential SATPS position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon in *The NAVSTAR Global Positioning System*, Van Nostrand Reinhold, 1992, pp. 33–90.

We claim:

1. A method for providing information on an imminent cellular phone handoff between cells for a mobile cellphone user, the method comprising the steps of:

determining a present location vector and a present velocity vector of a cellphone used by a cellphone user;

identifying a first cell on a cell map in which the cellphone is presently located;

identifying a second cell that is adjacent to the first cell, where the first and second cell are separated by a cell boundary, and the cellphone will pass into the second cell if the cellphone velocity vector is unchanged;

when the cellphone location vector is within the first cell and the cellphone is engaged in a cellular communication, estimating a remaining time $\Delta t1$ before the cellphone will pass into the second cell, if the cellphone velocity vector is unchanged;

advising the cellphone user of the remaining time when the remaining time lies in a selected range of times, determining whether an unused cellular frequency pair is available within said second cell to provide servicing of said cellular communication in which said cellphone user is engaged;

advising said cellphone user if an unused cellular frequency pair is not available within said second cell to provide servicing of said cellular communication in which said cellphone user is engaged; and advising said cellphone user of at least one alternative action that may be taken to avoid passing into said second cell, when an unused cellular frequency pair is not available within said second cell.

2. The method of claim 1, further comprising the step of choosing said selected range of times to include the range 3–30 sec.

3. The method of claim 1, further comprising the steps of:

selecting at least one alternative velocity vector, having substantially the same magnitude as, but having a different direction than, the present velocity vector;

identifying a candidate cell, which is adjacent to said first cell and which can but need not coincide with said second cell, where said first cell and the candidate cell are separated by a second boundary, and said cellphone will pass into the candidate cell if said present velocity vector is replaced by the alternative velocity vector and said cellphone moves in the direction of the alternative velocity vector;

when said cellphone location vector is within said first cell and said cellphone is engaged in a cellular communication, estimating a second remaining time Dt2 before said cellphone will pass into the candidate cell, if said present velocity vector is replaced by the alternative velocity vector and said cellphone moves in the direction of the alternative velocity vector; and advising said cellphone user of the second remaining time.

4. The method of claim 1, wherein said step of determining said present location vector and said present velocity vector of said cellphone used by said cellphone user comprises the step of providing indicia for at least a portion of a route that said cell phone user will follow in said first cell and said second cell.

5. A method for minimizing loss of a cellular connection within a cellzone, the method comprising the steps of:

determining a present location vector and a present velocity vector of a cellphone used by a cellphone user;

identifying a cell on a cell map in which the cellphone is presently located; identifying a signal strength hole region within the cell within which signal strength of a cellular connection is below a selected signal strength threshold;

using information on the present location vector and present velocity vector of the cellphone to determine whether the cellphone is likely to pass into the signal strength hole region, if the cellphone velocity vector is unchanged;

when the cellphone is determined to be likely to pass into the signal strength hole region, determining the time remaining before this likelihood occurs and advising the cellphone user of this likelihood and of the estimated time remaining before this likelihood occurs; and advising said cellphone user of at least one alternative action that may be taken to avoid passing into said signal strength hole region, when said cellphone is determined to be likely to pass into said signal strength hole region.

6. The method of claim 5, further comprising the step of advising said cellphone user of said likelihood and of said estimated remaining time before said likelihood occurs, when said remaining time is no greater than a selected remaining time threshold.

7. The method of claim 5, further comprising the step of choosing said remaining time threshold to be in the range 3–30 sec.

8. The method of claim 5, wherein said step of identifying said signal strength hole region comprises the steps of:

identifying at least three locations at which said signal strength of said cellular connection is below said selected signal strength threshold; and estimating said signal strength hole region to be the convex hull of the at least three locations.

9. The method of claim 5, wherein said step of determining said present location vector and said present velocity vector of said cellphone used by said cellphone user comprises the step of providing indicia for at least a portion of a route that said cell phone user will follow in said cell.

10. Apparatus for providing information on an imminent cellular phone handoff between cells for a mobile cellphone user, the apparatus comprising:

a location determination (LD) system that receives LD signals and determines a present location vector and a present velocity vector of a cellphone used by a cellphone user; and a computer that communicates with the LD system and that is programmed:

to identify a first cell on a cell map in which the cellphone is presently located;

to identify a second cell that is adjacent to the first cell, where the first and second cell are separated by a cell boundary, and the cellphone will pass into the second cell if the cellphone velocity vector is unchanged;

when the cellphone location vector is within the first cell and the cellphone is engaged in a cellular communication, to estimate a remaining time Dt1 before the cellphone will pass into the second cell, if the cellphone velocity vector is unchanged;

to advise the cellphone user of the remaining time when the remaining time lies in a selected range of times;

to determine whether an unused cellular frequency pair is available within said second cell to provide servicing of said cellular communication in which said cellphone user is engaged;

to advise said cellphone user if an unused cellular frequency pair is not available within said second cell to provide servicing of said cellular communication in which said cellphone user is engaged; and to advise said cellphone user of at least one alternative action that may be taken to avoid passing into said second cell, when an unused cellular frequency pair is not available within said second cell.

11. The apparatus of claim 10, wherein said selected range of times is chosen to include the range 3–30 sec.

12. The apparatus of claim 10, wherein said computer is further programmed:

to select at least one alternative velocity vector, having substantially the same magnitude as, but having a different direction than, the present velocity vector;

to identify a candidate cell, which is adjacent to said first cell and which can but need not coincide with said second cell, where said first cell and the candidate cell are separated by a second boundary, and said cellphone will pass into the candidate cell id said present velocity vector is replaced by the alternative velocity vector and said cellphone moves in the direction of the alternative velocity vector;

when said cellphone location vector is within said first cell and said cellphone is engaged in a cellular communication, to estimate a second remaining time Dt2 before said cellphone will pass into the candidate cell, if said present velocity vector is replaced by the alternative velocity vector and said cellphone moves in the direction of the alternative velocity vector; and to advise said cellphone user of the second remaining time.

13. The apparatus of claim 10, wherein said computer determines said present location vector and said present velocity vector of said cellphone used by said cellphone user by providing indicia for at least a portion of a route that said cell phone user will follow in said first cell and said second cell and by estimating if and where said cellphone will cross a boundary from said first cell into said second cell.

14. Apparatus for minimizing loss of a cellular connection within a cellzone, the apparatus comprising:

a location determination (LD) system that receives LD signals and determines a present location vector and a present velocity vector of a cellphone used by a cellphone user; and a computer that communicates with the LD system and that is programmed:

to identify a cell on a cell map in which the cellphone is presently located;

to identify a signal strength hole region within the cell within which signal strength of a cellular connection is below a selected signal strength threshold;

to use information on the present location vector and present velocity vector of the cellphone to determine whether the cellphone is likely to pass into the signal strength hole region, if the cellphone velocity vector is unchanged;

when the cellphone is determined to be likely to pass into the signal strength hole region, to determine the time remaining before this likelihood occurs and advising the cellphone user of this likelihood and of the estimated time remaining before this likelihood occurs; and to advise said cellphone user of at least one alternative action that may be taken to avoid passing into said signal strength hole region, when said cellphone is determined to be likely to pass into said signal strength hole region.

15. The apparatus of claim 14, wherein said computer is further programmed to advise said cellphone user of said likelihood and of said estimated remaining time before said likelihood occurs, when said remaining time threshold.

16. The apparatus of claim 14, wherein said remaining time threshold is chosen to be in the range 3–30 sec.

17. The apparatus of claim 14, wherein said computer identifies said signal strength hole region by:

identifying at least three locations at which said signal strength of said cellular connection is below said selected signal strength threshold; and estimating said signal strength hole region to be the convex hull of the at least three locations.

18. The apparatus of claim 14, wherein said computer determines said present location vector and said present velocity vector of said cellphone used by said cellphone user by providing indicia for at least a portion of a route that said cellphone user will follow in said cell and estimating if and where said cellphone user will pass into said signal strength hole region.

* * * * *